United States Patent
Li et al.

(10) Patent No.: US 11,029,706 B2
(45) Date of Patent: Jun. 8, 2021

(54) FLIGHT CONTROL SYSTEM FOR DETERMINING A FAULT BASED ON ERROR BETWEEN A MEASURED AND AN ESTIMATED ANGLE OF ATTACK

(71) Applicant: The Boeing Company, Chicago, IL (US)

(72) Inventors: Sherwin Chunshek Li, Edmonds, WA (US); Brian Whitehead, Renton, WA (US); Brian Kenyon Rupnik, Lake Stevens, WA (US); Kioumars Najmabadi, Bellevue, WA (US)

(73) Assignee: The Boeing Company, Chicago, IL (US)

(*) Notice: Subject to any disclaimer, the term of this patent is extended or adjusted under 35 U.S.C. 154(b) by 225 days.

(21) Appl. No.: 16/213,423

(22) Filed: Dec. 7, 2018

(65) Prior Publication Data

US 2020/0183424 A1    Jun. 11, 2020

(51) Int. Cl.
*G05D 1/08*    (2006.01)
*B64F 5/60*    (2017.01)

(52) U.S. Cl.
CPC ............. *G05D 1/0808* (2013.01); *B64F 5/60* (2017.01)

(58) Field of Classification Search
CPC ....... G05D 1/0808; B64F 5/60; G01P 13/025; G01P 5/16; G01P 21/025; B64D 45/00; B64D 2045/0085
See application file for complete search history.

(56) References Cited

U.S. PATENT DOCUMENTS

| 3,691,356 A | | 9/1972 | Miller | |
|---|---|---|---|---|
| 4,046,341 A | * | 9/1977 | Quinlivan | G05D 1/0825 244/181 |
| 6,131,055 A | * | 10/2000 | Patrick | G01C 23/00 340/974 |

(Continued)

FOREIGN PATENT DOCUMENTS

| EP | 1480043 A1 | 11/2004 |
|---|---|---|
| EP | 2422204 A1 | 2/2012 |

(Continued)

OTHER PUBLICATIONS

Luo, Jia; Wilson, Douglas Lee; Unpublished U.S. Appl. No. 15/620,224, filed Jun. 12, 2017.

(Continued)

*Primary Examiner* — Thomas G Black
*Assistant Examiner* — Ana D Thomas

(57) ABSTRACT

A flight control system for an aircraft is disclosed and includes one or more processors and a memory coupled to the processors. The memory stores data comprising a database and program code that, when executed by the one or more processors, causes the flight control system to receive as input a measured angle of attack that is based on a raw angle of attack and an estimated angle of attack based on a total pressure. The flight control system is further caused to compare the measured angle of attack with the estimated angle of attack to determine an error. In response to determining that the error between the measured angle of attack and the estimated angle of attack exceeds a threshold value, the flight control system determines the presence of a fault with an angle of attack value.

20 Claims, 19 Drawing Sheets

(56) References Cited

U.S. PATENT DOCUMENTS

| | | | |
|---|---|---|---|
| 6,273,370 B1* | 8/2001 | Colgren | G01C 21/16 244/181 |
| 6,772,080 B2* | 8/2004 | Luo | G05D 1/0825 340/949 |
| 7,043,345 B2* | 5/2006 | Warkomski | F42B 15/01 244/181 |
| 9,128,109 B1* | 9/2015 | O'Neill | G01P 5/00 |
| 10,006,928 B1* | 6/2018 | Hagerott | G01P 5/16 |
| 2011/0071710 A1 | 3/2011 | Puig et al. | |
| 2014/0316613 A1* | 10/2014 | Jang | G05B 23/0286 701/3 |
| 2014/0330455 A1* | 11/2014 | McIntyre | B64D 43/00 701/3 |
| 2015/0057960 A1* | 2/2015 | Dupont De Dinechin | G01P 5/16 702/98 |
| 2016/0041196 A1* | 2/2016 | Frey, Jr. | G01P 5/14 702/142 |
| 2016/0325845 A1 | 11/2016 | Mehlen et al. | |
| 2017/0356925 A1* | 12/2017 | Berdoulat | G01P 13/025 |
| 2018/0299293 A1* | 10/2018 | Ell | G01C 25/00 |
| 2019/0378419 A1* | 12/2019 | Gansmandel | B64D 45/00 |
| 2020/0309810 A1 | 10/2020 | Carvalho et al. | |

FOREIGN PATENT DOCUMENTS

| | | |
|---|---|---|
| EP | 3246712 A1 | 11/2017 |
| EP | 3415924 A1 | 12/2018 |

OTHER PUBLICATIONS

N Shantha Kumar, "Filtering and Fusion based Reconstruction of Angle of Attack", National Conference on Range Technology (NACORT) 2006, pp. 1-2, Jul. 7, 2010.

EPO, Extended European Search Report, pp. 1-5, Feb. 14, 2020.

Cristofaro Andrea et al, "An unknown input observer approach to icing detection for unmanned aerial vehicles with linearized longitudinal motion11", American Control Conference (ACC), American Automatic Control Council, 2015, pp. 207-213.

Notice of Allowance, U.S. Appl. No. 16/213,406, dated Mar. 12, 2021.

* cited by examiner

FLIGHT CONTROL SYSTEM FOR DETERMINING A FAULT BASED ON ERROR BETWEEN A MEASURED AND AN ESTIMATED ANGLE OF ATTACK

INTRODUCTION

The present disclosure relates to flight control systems. More specifically, the present disclosure relates to flight control systems that determine the presence of a fault when the error between a measured angle of attack and an estimated angle of attack exceeds a threshold value.

BACKGROUND

A Common Mode Monitor (CMM) or fault detector is typically used to detect pitot tube faults, such as detecting when pitot tubes may be blocked with ice. Pitot tubes provide information that is used to calculate the speed and altitude of an aircraft. In operation, each pitot tube, or channel, sends data to the CMM. Because pitot tubes are pressure based sensors, when a pitot tube is blocked, its output may be inaccurate. Thus, it is desirable to generate a signal that can be used in lieu of the pitot tube signal when a pitot tube fault is suspected.

SUMMARY

According to several aspects, a flight control system for an aircraft is disclosed. The flight control system includes one or more processors and a memory coupled to the one or more processors. The memory stores data comprising a database and program code that, when executed by the one or more processors, causes the flight control system to receive as input a measured angle of attack that is based on a raw angle of attack. The flight control system also receives as input an estimated angle of attack that is based on a total pressure. The flight control system also compares the measured angle of attack with the estimated angle of attack to determine an error. In response to determining that the error between the measured angle of attack and the estimated angle of attack exceeds a threshold value, the flight control system determines the presence of a fault with an angle of attack value.

In an additional aspect of the present disclosure, a flight control system for an aircraft is disclosed. The flight control system includes one or more processors and a plurality of angle of attack sensors in communication with the one or more processors, where the plurality of angle of attack sensors are configured to measure a raw angle of attack. The flight control system also includes a plurality of pitot tubes in communication with the one or more processors, where the plurality of pitot tubes measure a total pressure. The flight control system also includes a memory coupled to the one or more processors, the memory storing data comprising a database and program code that, when executed by the one or more processors, causes the flight control system to receive as input a measured angle of attack that is based on the raw angle of attack. The flight control system also receives as input an estimated angle of attack that is based on the total pressure. The flight control system compares the measured angle of attack with estimated angle of attack to determine an error. In response to determining that the error between the measured angle of attack and the estimated angle of attack exceeds a threshold value, the flight control system determines the presence of a fault with a majority of the plurality of angle of attack sensors.

In yet another aspect of the disclosure, a method of determining a fault with an angle of attack value for an aircraft is disclosed. The method includes receiving as input, by a computer, a measured angle of attack that is based on a raw angle of attack. The method also includes receiving as input, by the computer, an estimated angle of attack that is determined based on a total pressure. The method further includes comparing, by the computer, the measured angle of attack with the estimated angle of attack to determine an error. In response to determining the error between the measured angle of attack and the estimated angle of attack exceeds a threshold value, the method includes determining the presence of the fault with the angle of attack value.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a flight control system for an aircraft that detects a fault based on an angle of attack value. The flight control system switches from a measured angle of attack to an estimated angle of attack value in response to detecting the fault. The measured angle of attack is determined based on data collected from a plurality of angle of attack sensors. In contrast, the estimated angle of attack is not based on the values measured by the angle of attack sensors. Instead, the estimated angle of attack is determined based on a total pressure measured by a plurality of pitot tubes that are part of the aircraft.

In one embodiment, in response to determining the presence of a common mode pneumatic event is detected, the flight control system determines the measured angle of attack without using the for true air speed of the aircraft and the measured Mach number. A common mode pneumatic event represents a condition where a majority of the plurality of pitot tubes are blocked or do not produce accurate readings.

The following description is merely exemplary in nature and is not intended to limit the present disclosure, application, or uses.

Figure 1:
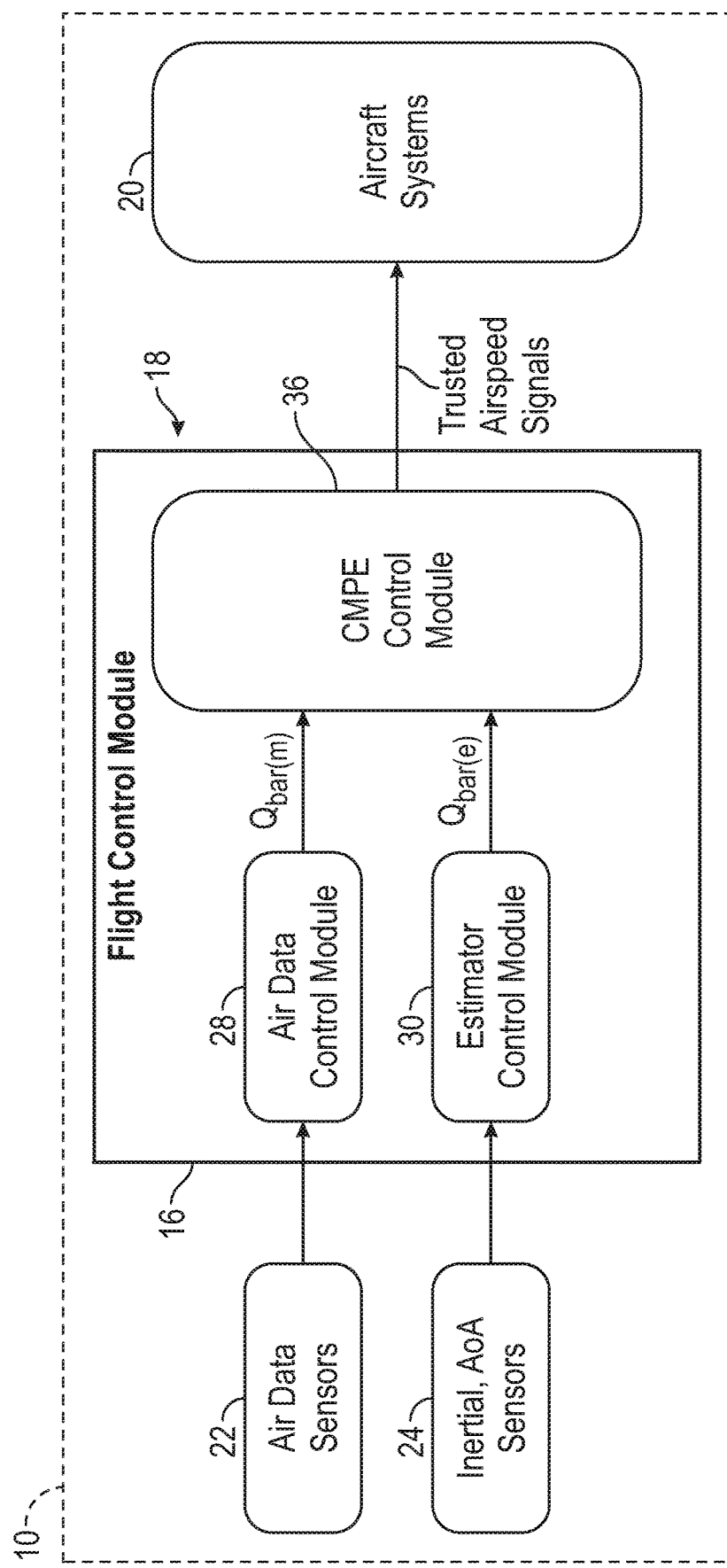
FIG. 1 is a schematic diagram of an exemplary flight control system of an aircraft according to an exemplary embodiment.
Figure 2:
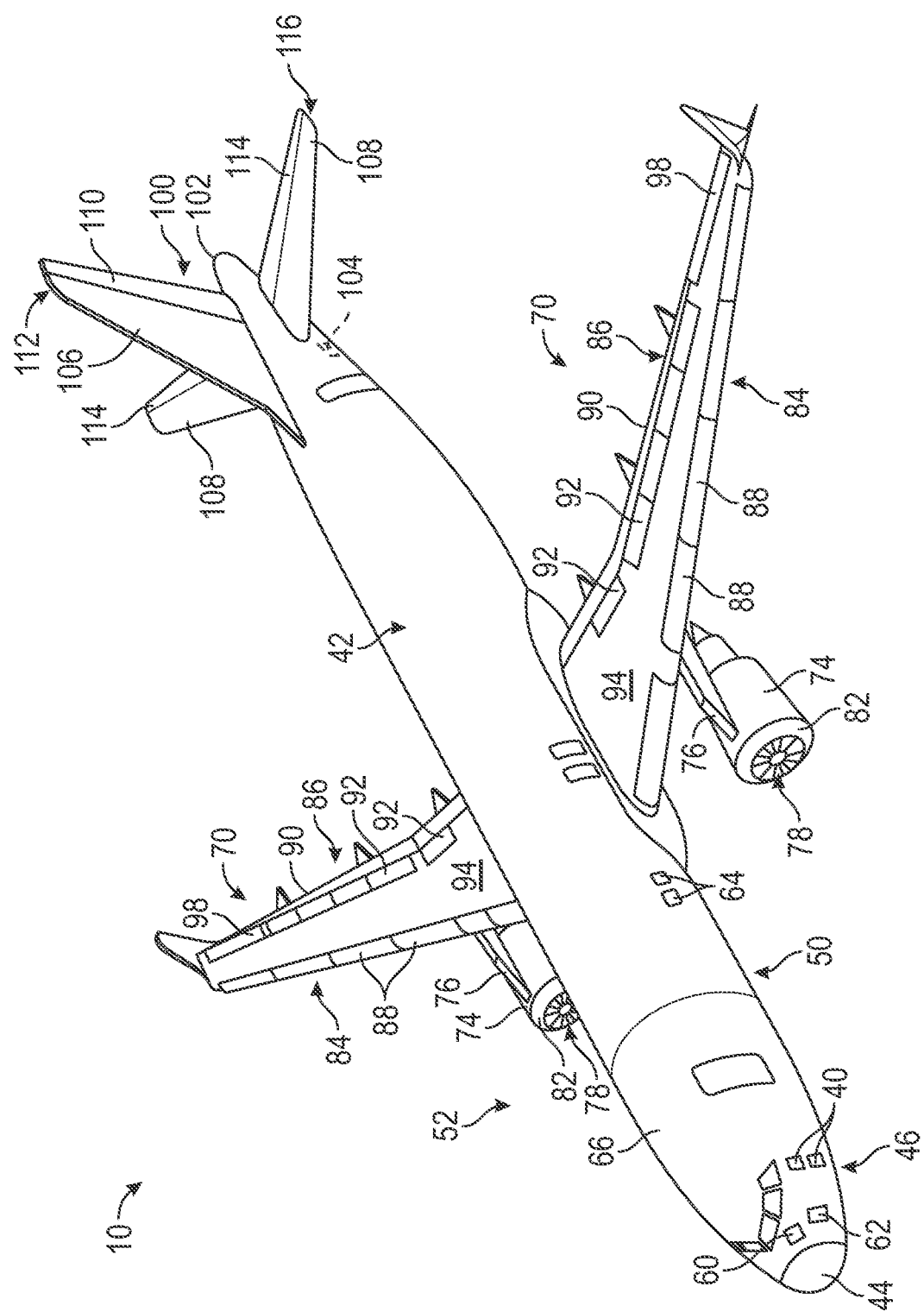
FIG. 2 is an elevated perspective view of the aircraft illustrating various control surfaces and sensors according to an exemplary embodiment.

Referring to FIG. 1, an exemplary schematic diagram of an aircraft 10 including a flight control system 18 is shown. The flight control system 18 includes a flight control module 16 configured to determine trusted air speed signals that are sent to one or more aircraft systems 20. The trusted air speed signals include an estimated Mach number $M_{MDL}$, a calibrated air speed $Vcas_{MDL}$, and a true air speed of the aircraft $Vt_{MDL}$. The flight control module 16 determines a measured dynamic pressure $Q_{bar(m)}$ and a synthetic or estimated dynamic pressure $Q_{bar(e)}$. The measured dynamic pressure $Q_{bar(m)}$ is determined by an air data control module 28 based on data collected from a plurality of air data sensors 22. Specifically, the air data sensors 22 include a plurality of pitot tubes 40 (FIG. 2). However, the estimated dynamic pressure $Q_{bar(e)}$ is an estimated value determined by an estimator control module 30. The estimated dynamic pressure $Q_{bar(e)}$ is based on data collected from a plurality of control surfaces, inertial, and angle of attack sensors 24. It is to be appreciated that the estimated dynamic pressure $Q_{bar(e)}$ is not determined based on data collected from air data sensors 22 (i.e., the plurality of pitot tubes 40).

The flight control system 18 includes a common mode pneumatic event (CMPE) fault detection and signal selector, which is referred to as a CMPE control module 36. In the present disclosure, the common mode pneumatic event occurs when a majority of the plurality of pitot tubes 40 (FIG. 2) are blocked or otherwise not operating correctly simultaneously or within a relatively short amount of time (e.g., about 0.001 to about 10 seconds in one embodiment). For example, the plurality of pitot tubes 40 may be blocked because of icing or by foreign particles such as volcanic ash. The plurality of pitot tubes 40 are each configured to measure pressure, and the readings from each pitot tube 40 are combined into a single measurement. The measurements from each pitot tube 40 may be combined by averaging or a mid-value select, which in turn produces a total pressure $P_{TOT}$. However, when blocked the plurality of pitot tubes 40 produce a total pressure $P_{TOT}$ that is not accurate. Specifically, the reading for total pressure $P_{TOT}$ is very low, which results in an unrealistic calculated air speed. The calculated airspeed is provided to the aircraft systems 20.

Referring to FIG. 1, the measured dynamic pressure $Q_{bar(m)}$ is used to determine the estimated Mach number $M_{MDL}$, the calibrated air speed $Vcas_{MDL}$, and the true air speed of the aircraft $Vt_{MDL}$ (i.e., the trusted air speed values) during normal operating conditions. For purposes of the present disclosure, normal operating conditions or the normal mode of operation is when a majority of the plurality of pitot tubes 40 (FIG. 2) are functioning. However, it is to be appreciated that the normal mode of operation is also based on other operating parameters of the aircraft 10 such as, for example, inertial data sensors.

In response to receiving a notification that a majority of pitot tubes 40 are blocked (i.e., the air speed value is now unrealistically low), the CMPE control module 36 switches from measured dynamic pressure $Q_{bar(m)}$ to the estimated dynamic pressure $Q_{bar(e)}$ to determine the estimated Mach number $M_{MDL}$, the calibrated air speed $Vcas_{MDL}$, and the true air speed of the aircraft $Vt_{MDL}$. In other words, when a majority of the plurality of pitot tubes 40 are not blocked, the flight control system 18 determines the trusted air speeds based on measurements from the plurality of pitot tubes 40. However, once the flight control system 18 determines a majority of the pitot tubes are blocked, then the flight control system 18 determines the trusted air speeds based on the estimated dynamic pressure $Q_{bar(e)}$.

The aircraft systems 20 include both hardware and software for providing aircraft maneuver control. In one embodiment, the aircraft systems 20 include, but are not limited to, integrated flight control electronic computers, avionic computers, engine electronic control computers, and the displays and crew alerting computers. The integrated flight control electronic computers may include software partitions to provide functionality such as, but not limited to, primary flight control, autopilot, integrated signal management, air data reference function. The avionic computers provide autothrottle control, flight plans, and waypoint guidance. The engine electronic control computers may provide propulsion controls for engine thrusts. The displays and crew alerting computers may provide real-time aircraft state information such as, but not limited to, altitude, air speed, pitch and bank angles, air temperature, and any system warning messages.

FIG. 2 is an elevated perspective view of an exterior 42 of the aircraft 10. The plurality of pitot tubes 40 are placed on a nose 46 of the aircraft, adjacent to a radome 44.

Specifically, in one non-limiting example, two of the plurality of pitot tubes 40 are placed on a left hand side 50 of the aircraft and another pitot tube 40 is located on a right side 52 of the aircraft 10 (not visible in FIG. 2). The pitot tubes 40 on the left and right hand sides 50, 52 of the aircraft 10 correspond to a pilot, a co-pilot, and a backup. Although three pitot tubes 40 are described, it is to be appreciated that more pitot tubes or fewer pitot tubes may be used as well. In the present example, at least two of the three pitot tubes 40 would be blocked or inoperable to trigger the common mode pneumatic event.

In addition to the plurality of pitot tubes 40, in the exemplary embodiment as shown in FIG. 2 the aircraft 10 also includes a plurality of angle of attack sensors 60 (only one is visible in FIG. 2) and two total air temperature (TAT) probes 62 (only one is visible in FIG. 2). The plurality of angle of attack sensors 60 and the probes 62 are located on the left hand side 50 and the right hand side 52 of the nose 46 of the aircraft 10. The aircraft 10 also includes static ports 64 located on both the left hand side 50 and the right hand side 52 of the aircraft 10 (only the left side is visible in FIG. 2). The static ports 64 are located on a fuselage 66 in a location aft of the plurality of pitot tubes 40, and adjacent to the wings 70.

A nacelle 74 is attached to each wing 70 by a pylon 76. Each nacelle 74 houses a corresponding aircraft engine 78. An engine total air temperature (TAT) probe (not visible in FIG. 2) is positioned in an inlet cowl 82 of each nacelle. An engine speed sensor (not visible in FIG. 2) measures the rotational speed of a corresponding one of the aircraft engines 78. In an embodiment, the engine speed sensor is located within an engine core in front of the high pressure stator vane rings (not visible in FIG. 2).

The control surfaces 68 (FIG. 3) of the aircraft 10 are now described. The wings 70 both include a leading edge 84 and a trailing edge 86. Both wings 70 include corresponding leading edge slats 88 located at the leading edge 84 of each wing 70 and corresponding trailing edge flaps 90 located at the trailing edge 86 of each wing 70. The wings 70 also include one or more spoilers 92 disposed along an upper surface 94 of each wing 70 and a pair of ailerons 98 located at the trailing edge 86 of each wing 70. A tail or aft end 100 of the aircraft 10 terminates at an exhaust outlet 102. The exhaust outlet 102 is for an auxiliary power unit (APU) 104 located at the tail end of the aircraft 10. The aft end 100 of the aircraft 10 includes a vertical stabilizer 106 and two horizontal stabilizers 108. A rudder 110 is located at a trailing edge 112 of the vertical stabilizer 106, and an elevator 114 is located at a trailing edge 116 of each horizontal stabilizer 108. The rudder 110 is moveable to control the yaw of the aircraft 10 and the elevators 114 are moveable to control the pitch of the aircraft 10.

Figure 3:
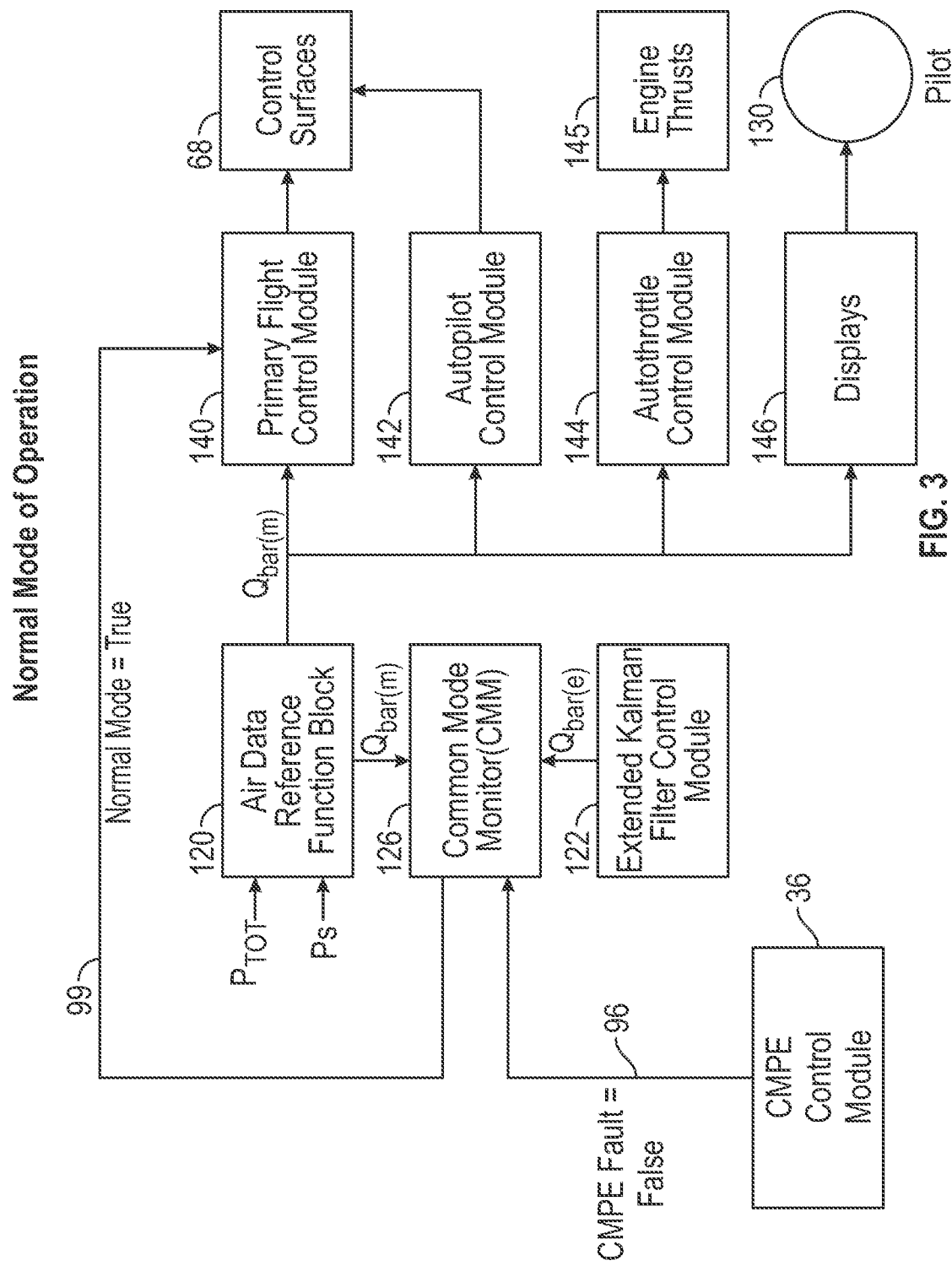
FIG. 3 is a flowchart illustrating the flight control system during a normal mode of operation according to an exemplary embodiment.

FIG. 3 is a block diagram illustrating a normal mode of operation of the aircraft 10. During the normal mode of operation, a majority of the plurality of pitot tubes 40 (FIG. 2) are not blocked. In the embodiment as shown in FIG. 3, no common mode pneumatic event has occurred. Thus, an output 96 generated by the CMPE control module 36 is set to a FALSE value (i.e., CMPE FAULT=FALSE). Referring to both FIGS. 2 and 3, the total pressure $P_{TOT}$ from the plurality of pitot tubes 40 and the static pressure Ps from the static ports 64 are sent to an air data reference function block 120. The air data reference function block 120 determines the measured dynamic pressure $Q_{bar(m)}$ based on the total air pressure $P_{TOT}$ from the plurality of pitot tubes 40 and the static pressure Ps. Specifically, the measured dynamic pressure $Q_{bar(m)}$ is the difference between the total air pressure $P_{TOT}$ and the static pressure Ps. In the embodiment as shown in FIG. 3, the measured dynamic pressure $Q_{bar(m)}$ is accurate because the plurality of pitot tubes 40 are not blocked. Accordingly, the measured dynamic pressure $Q_{bar(m)}$ determined by the air data reference function block 120 is received as input by a primary flight control module 140, an autopilot control module 142, an autothrottle control module 144, and one or more displays 146.

Referring to FIGS. 1 and 3, the flight control system 18 determines the trusted air speeds (the estimated Mach number $M_{MDL}$, the calibrated air speed $Vcas_{MDL}$, and the true air speed of the aircraft $Vt_{MDL}$) as long as the aircraft 10 is in the normal mode of operation. A flight envelope protection mode, an autopilot feature, and an autothrottle feature are available during the normal mode of operation.

Figure 4:
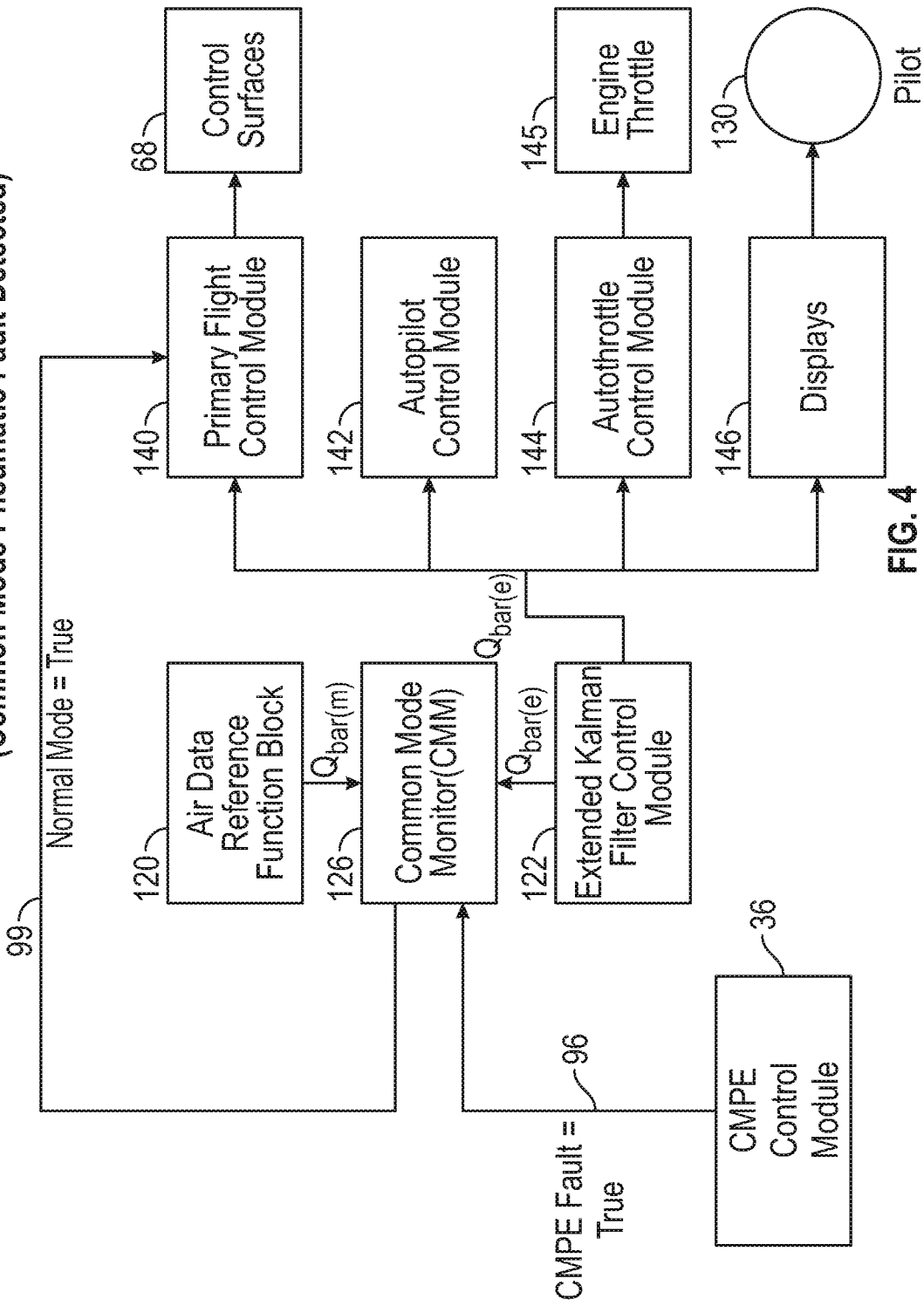
FIG. 4 is a flowchart of the flight control system shown in FIG. 3 responding to a common mode pneumatic event according to an exemplary embodiment.

The plurality of displays 146 may include a Crew Alerting System (CAS) display. The messages shown on the CAS display are triggered by measurements and events outside normal thresholds or tolerances of the aircraft 10 and are visible to a pilot 130 and other crew members. When the aircraft 10 is in the normal mode of operation, the measured dynamic pressure $Q_{bar(m)}$ determined by the air data reference function block 120 is received as input by the primary flight control module 140, the autopilot control module 142, the autothrottle control module 144, and the plurality of displays 146. However, when a majority of the plurality of pitot tubes 40 (FIG. 2) are blocked the aircraft 10 switches from the normal mode of operation and into an extended mode of operation, which is explained in greater detail below and is shown in FIG. 4.

Referring to FIG. 3, when the aircraft 10 is in the normal mode of operation and the autopilot feature is engaged, then the autopilot control module 142 sends autopilot commands to the primary flight control module 140. The primary flight control module 140 determines surface control commands that are sent to the control surfaces 68, and the autothrottle control module 144 determines engine thrusts 145 of the aircraft engines 78 (FIG. 2). When the aircraft 10 is in the normal operating mode but the autopilot feature is not engaged, then wheel and column commands generated by the pilot 130 are processed by the primary flight control module 140 in accordance with aircraft control laws such as, for example, pitch control laws and lateral control laws. Additionally, the flight envelope control protect feature is engaged.

Figure 5:
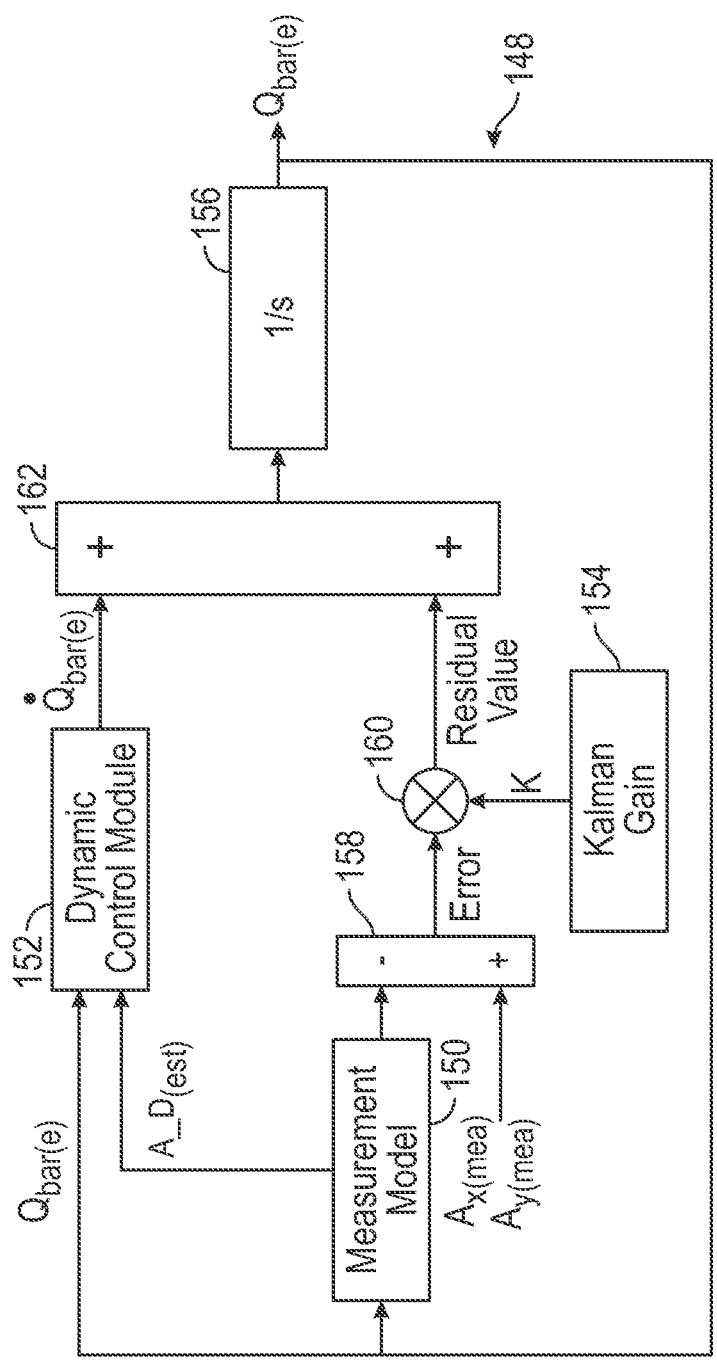
FIG. 5 is a block diagram of an extended Kalman filter for determining an estimated dynamic pressure according to an exemplary embodiment.
Figure 6:
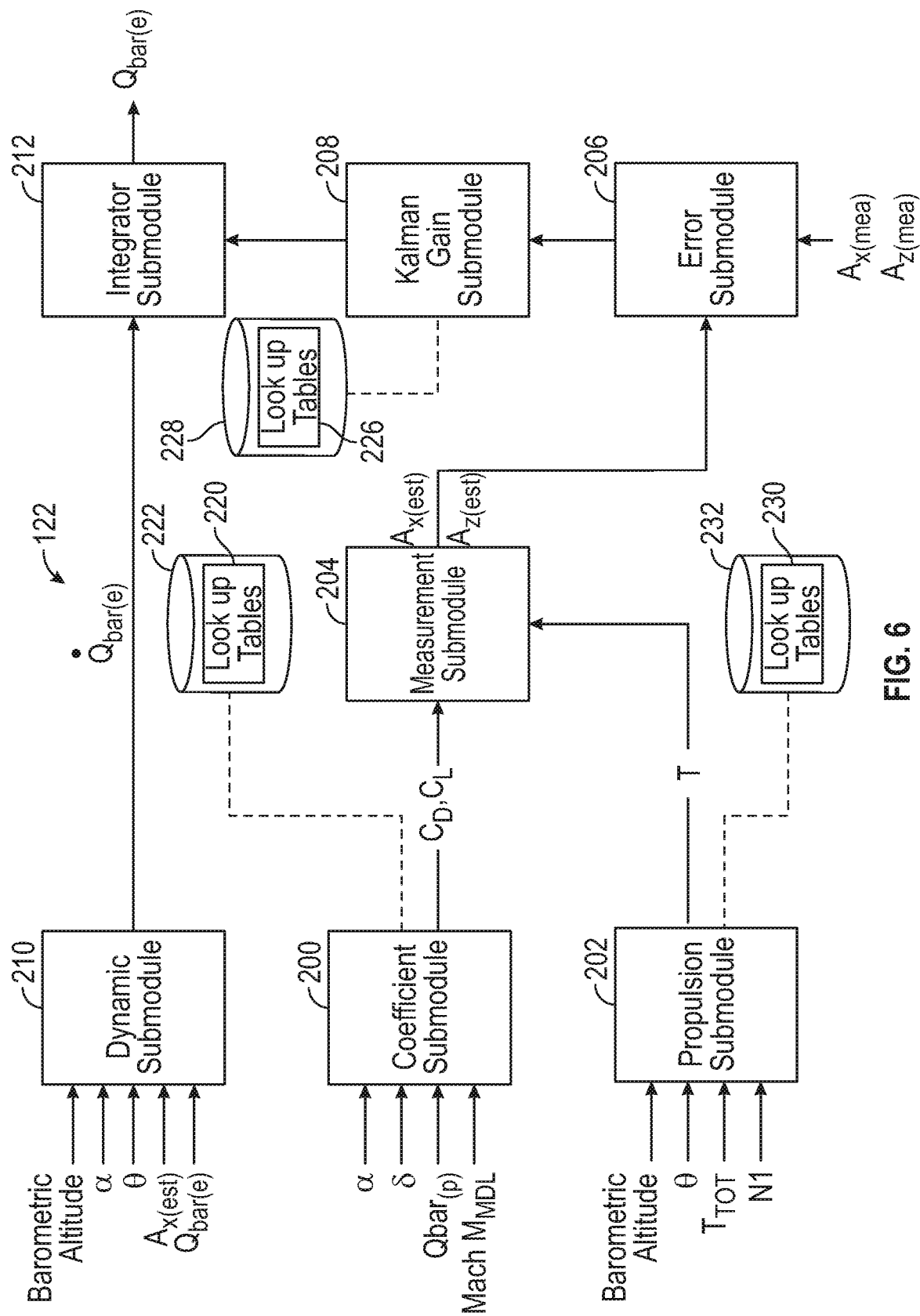
FIG. 6 illustrates a control module for determining the estimated dynamic pressure according to an exemplary embodiment.

An extended Kalman Filter (EKF) control module 122 determines the estimated dynamic pressure $Q_{bar(e)}$. The EKF control module 122 is described in greater detail below and is illustrated in FIGS. 5 and 6. A common mode monitor (CMM) 126 receives as input the measured dynamic pressure $Q_{bar(m)}$ from the air data reference function block 120, the estimated dynamic pressure $Q_{bar(e)}$ from the EKF control module 122, and the output 96 from the CMPE control module 36. The CMM 126 determines a common mode failure, which is also referred to as a fault, of the measured dynamic pressure $Q_{bar(m)}$. The common mode failure of the measured dynamic pressure $Q_{bar(m)}$ represents a failure of a majority of the plurality of pitot tubes 40 (FIG. 2).

The common mode failure of the measured dynamic pressure $Q_{bar(m)}$ is determined based on a difference between the measured dynamic pressure $Q_{bar(m)}$ and the estimated dynamic pressure $Q_{bar(e)}$. Specifically, the CMM 126 determines a common mode failure of the measured dynamic pressure $Q_{bar(m)}$ has occurred when a difference between the measured dynamic pressure $Q_{bar(m)}$ and the estimated dynamic pressure $Q_{bar(e)}$ exceeds a threshold value for a threshold amount of time. In one exemplary embodiment, the threshold value is more than fifty percent and the threshold amount of time ranges from about five seconds to about fifteen seconds. However, it is to be appreciated that other values may be used as well. In the embodiment as shown in FIG. 3, the CMM 126 determines no common mode fault has occurred (e.g., the threshold value between the measured dynamic pressure $Q_{bar(m)}$ and the estimated dynamic pressure $Q_{bar(e)}$ and the output 96 indicates that CMPE FAULT=FALSE). Accordingly, the CMM 126 sends an output 99 to the primary flight control module 140 indicating the normal mode of operation (i.e., Normal Mode=TRUE).

Turning now to FIG. 4, the extended normal mode of operation is shown. During the extended normal mode of operation, a majority of the plurality of pitot tubes 40 (FIG. 2) are blocked. Thus, the CMPE control module 36 detects a common mode pneumatic event. However, during the extended mode of operation, the CMPE control module 36 suppresses the common mode pneumatic event during a time delay, which is accomplished by continuing to generate an output 96 that indicates no common mode pneumatic event is detected (i.e., CMPE FAULT=FALSE). In other words, even though a common mode pneumatic event is detected, the CMPE control module 36 sends a message to the CMM 126 indicating that no common mode pneumatic event has occurred. However, the CMM 126 determines that a common mode fault has occurred (i.e., the difference between the measured dynamic pressure $Q_{bar(m)}$ and the estimated dynamic pressure $Q_{bar(e)}$ exceeds the threshold value for the threshold amount of time). In response to receiving the FALSE value from the CMPE control module 36 (which indicates no common mode pneumatic event) while simultaneously determining the presence of a common mode fault, the CMM 126 continues to send generate an output 99 indicating normal mode operation (i.e., Normal Mode=TRUE). The CMPE control module 36 continues to suppress the common mode pneumatic event during the time delay. In one embodiment, the time delay is about 120 seconds. This amount may vary based on the length of time that an intermittent common mode pneumatic event may occur, however, is to be appreciated that there is a limit on the length of the time delay. The time delay is required to be at least 60 seconds. As seen in FIG. 4, when the aircraft 10 is in the extended normal mode of operation the estimated dynamic pressure $Q_{bar(e)}$ determined by the EKF control module 122 is sent to the primary flight control module 140, the autopilot control module 142, the autothrottle control module 144, and the plurality of displays 146.

In some types of aircraft, the flight envelope protection system, pitch control, lateral control, and autopilot features are not available when the flight control system is in a secondary mode of operation. Instead, only simple pitch and roll controls are available. In other types of aircraft, a secondary autopilot feature may be available which provides basic autopilot maneuver controls that are independent of pitot air data signals. In the embodiment as shown in FIG. 4, the extended mode of operation allows for the primary flight control module 140, the autopilot control module 142, and the autothrottle control module 144 to operate as if no fault had been detected during the time delay. However, once the time delay is complete, then the common mode pneumatic event is no longer suppressed. Thus, if the CMPE control module 36 continues to detect a common mode pneumatic event, then the output 96 is now set to TRUE (i.e., CMPE FAULT=TRUE), and the aircraft 10 now switches into the secondary mode of operation.

Figure 7:
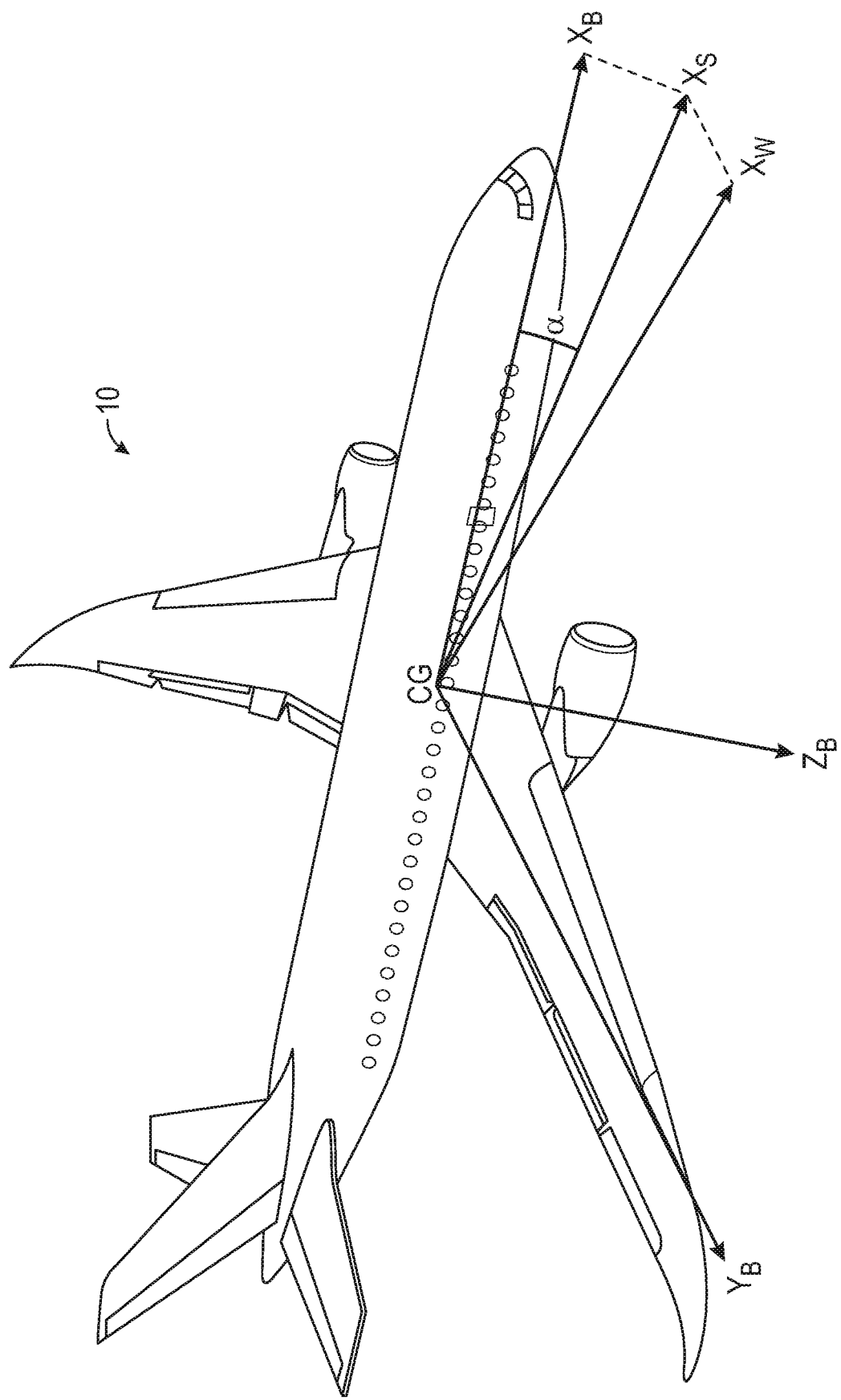
FIG. 7 is an elevated perspective view of the aircraft illustrating a center of gravity according to an exemplary embodiment.

FIG. 5 is a block diagram of an extended Kalman filter of the EKF control module 122. The block diagram represents a system 148 for determining estimated dynamic pressure $Q_{bar(e)}$ based on data collected from the plurality of control surface, inertial, and angle of attack sensors 24 (FIG. 1). In other words, the estimated dynamic pressure $Q_{bar(e)}$ is not determined based on the measurements from the plurality of pitot tubes 40 (FIG. 2). The EKF control module 122 includes a measurement model 150, a dynamic control module 152, a Kalman gain block 154, an integrator block 156, an error block 158, a multiplier 160, and an adder 162. The measurement model 150 predicts expected values of measured accelerations (longitudinal acceleration Ax, normal acceleration Az) in Equation 1 as:

$$h(\hat{x}) = \begin{bmatrix} \hat{A}_X \\ \hat{A}_Z \end{bmatrix} = \frac{1}{m} R(\alpha) \begin{bmatrix} C_D(\alpha, \hat{x}, P_S)S \\ C_L(\alpha, \hat{x}, P_S)S \end{bmatrix} \quad \text{Equation 1}$$

where m represents the mass of the aircraft 10, $C_D$ represents a coefficient of drag of the aircraft 10, $C_L$ represent a coefficient of lift of the aircraft 10, $P_S$ is static pressure, S is the reference area of a wing planform, α is the angle of attack, x is the estimated quantity (the estimated dynamic pressure $Q_{bar(e)}$), and R(a) is a rotational matrix of the forward stability-axis $X_S$ relative to the body-axis $X_B$ and the body-axis $Z_B$ of the aircraft 10 (FIG. 7). It is to be appreciated that the angle of attack α is assumed to be a measured value (i.e., measured by the plurality of angle of attack sensors 60).

Continuing to refer to FIG. 5, the dynamic control module 152 determines a rate of change for the estimated dynamic pressure, which is referred to as an estimated rate of change of the dynamic pressure $\dot{Q}_{bar(e)}$. The estimated rate of change of the dynamic pressure $\dot{Q}_{bar(e)}$ is determined based on an estimated longitudinal acceleration component $A\_D_{(est)}$ of the aircraft 10, which represents longitudinal acceleration along a forward stability-axis $X_S$ (seen in FIG. 7). Specifically, the estimated rate of change of the dynamic pressure $\dot{Q}_{bar(e)}$ is a function of a barometric altitude, the angle of attack α, a pitch angle θ, the estimated dynamic pressure $Q_{bar(e)}$, and an estimated longitudinal acceleration component $A\_D_{(est)}$ of the aircraft 10. In one embodiment, the estimated rate of change of the dynamic pressure $\dot{Q}_{bar(e)}$ is determined based on Equation 2, which is:

$$\dot{Q}_{bar(e)} = \sqrt{\frac{2q_{bar(e)}}{\rho}} \cdot \rho \cdot [g \cdot \sin(\alpha - \theta) - A_{D_{(est)}}] \quad \text{Equation 2}$$

α is the angle of attack, g is the acceleration of gravity, and ρ is air density.

The Kalman gain block 154 stores a Kalman gain value K. The Kalman gain value K represents the weight given to the current state of the aircraft 10 (i.e., the operating conditions). The Kalman gain value K is not a scalar value, and instead is represented based on a 2×2 matrix. The Kalman gain value K varies based on the operating parameters of the aircraft 10. Specifically, the Kalman gain value K is a dynamic value that is determined by a set of look-up tables 226 (seen in FIG. 6) stored on a database 228. The look-up tables 226 are generated based on operating conditions of the aircraft 10, and the inputs to the look-up tables are the angle of attack α and the estimated Mach number $M_{MDL}$ of the aircraft 10.

The error block 158 receives as input the estimated longitudinal acceleration $Ax_{(est)}$ and an estimated vertical acceleration $Az_{(est)}$ from the measurement model 150 as well as a measured longitudinal acceleration $Ax_{(mea)}$ and a measured vertical acceleration $Az_{(mea)}$, which are measured by accelerometers and are explained in greater detail below. The error block 158 determines an acceleration error value E by determining a first difference between the estimated longitudinal acceleration $Ax_{(est)}$ and the estimated vertical acceleration $Az_{(est)}$ and a second difference between the measured longitudinal acceleration $Ax_{(mea)}$ and the measured vertical acceleration $Az_{(mea)}$. The multiplier 160 receives as input the acceleration error value E and the Kalman gain value K, and determines an estimated state update by multiplying the acceleration error value E with and the Kalman gain value K.

The adder 162 receives as input the residual Kalman value from the multiplier 160 and the estimated rate of change of the dynamic pressure $\dot{Q}_{bar(e)}$ from the dynamic control module 152. The adder 162 combines the residual Kalman value with the estimated rate of change of the dynamic pressure $\dot{Q}_{bar(e)}$ together. The combined residual Kalman value and the estimated rate of change of the dynamic pressure $\dot{Q}_{bar(e)}$ are then sent to the integrator block 156. The integrator block 156 then integrates the sum of the residual Kalman value and the estimated rate of change of the dynamic pressure $\dot{Q}_{bar(e)}$ to determine the estimated dynamic pressure $\dot{Q}_{bar(e)}$.

FIG. 6 is an illustration of the EKF control module 122 including a plurality of submodules 200, 202, 204, 206, 208, 210, 212. The submodules 200, 202, 204, 206, 208, 210, 212 are shown as distinct components, which may indicate the use of modular programming techniques. However, the software design may decrease the extent to which the submodules 200, 202, 204, 206, 208, 210, 212 are distinct by combining at least some program functions of multiple modules into a single module. Moreover, the functions attributed to the submodules 200, 202, 204, 206, 208, 210, 212 may be distributed in other ways, or on other systems than those depicted. Thus, embodiments of the present disclosure are not limited to the specific arrangement of systems or modules shown in FIG. 6.

Referring now to both FIGS. 5 and 6, the EKF control module 122 and the system 148 correspond to one another. Specifically, a coefficient submodule 200 and a propulsion submodule 202 of the EKF control module 122 both correspond to the measurement model 150 of the system 148. A measurement submodule 204 of the EKF control module 122 corresponds to the adder 162 of the system 148. An error submodule 206 of the EKF control module 122 corresponds to the error block 158 of the system 148. A Kalman gain submodule 208 of the EKF control module 122 corresponds to the Kalman gain block 154 of the system 148. A dynamic submodule 210 of the EKF control module 122 corresponds to the dynamic control module 152 of the system 148. Finally, an integration submodule 212 corresponds to the integrator block 156 of the system 148.

The EKF control module 122 receives as input a plurality of operating parameters of the aircraft 10 (FIGS. 1 and 2). The operating parameters include, but are not limited to, the measured acceleration factors $Ax_{(mea)}$ and $Az_{(mea)}$, the angle of attack α, the barometric altitude, the pitch angle Θ, a deflection of the control surfaces δ of the aircraft 10, the total air temperature $T_{TOT}$, the engine speed N1 of both aircraft engines 78 (FIG. 2), and the static pressure $P_S$. The deflection of the control surfaces δ include at least some of the control surfaces show in FIG. 2. Specifically, in the embodiment as shown in FIG. 2, the deflection of the control surfaces δ include the leading edge slats 88, the trailing edge flaps 90, the spoilers 92, the ailerons 98, the vertical stabilizer 106, the horizontal stabilizers 108, the rudder 110, and the elevator 114.

FIG. 7 illustrates the body axes of the aircraft 10. The parameters $X_B$, $Y_B$, and $Z_B$ represent the x, y, and z body axes of the aircraft 10 respectively, and CG represents the center of gravity for the aircraft 10. The angle of attack α is measured between a body-axis $X_B$ of the aircraft 10 and a vector $X_S$, which represents a forward stability-axis of the aircraft 10. The forward stability-axis $X_S$ is a projection of an air speed direction $X_W$ of the aircraft 10 onto a plane defined by the x and z axes.

Referring now to FIGS. 6 and 7, the measured longitudinal acceleration $Ax_{(mea)}$ is the measured acceleration of the aircraft 10 in the direction of the body-axis $X_B$ of the aircraft and the measured vertical acceleration $Az_{(mea)}$ is the acceleration of the aircraft 10 in the direction of the body-axis $Z_B$. The measured longitudinal acceleration $Ax_{(mea)}$ and the measured vertical acceleration $Az_{(mea)}$ are determined by one or more accelerometers located at the center of gravity CG of the aircraft 10. However, many types of accelerometers actually measure the load factor. Thus, if the accelerometers do truly measure accelerations, then the corresponding load factor is calculated by subtracting the acceleration due to gravity along each axis.

The coefficient submodule 200 receives as input a plurality of first operating parameters that each represent an operating condition of the aircraft 10. The coefficient submodule 200 determines the drag coefficient $C_D$ and a lift coefficient $C_L$ based on the plurality of first operating parameters. Thus, it is to be appreciated that the EKF control module 122 determines the estimated dynamic pressure $Q_{bar(e)}$ based on both the drag coefficient $C_D$ and the lift coefficient $C_L$. The first plurality of coefficients include the angle of attack α, the deflection of the control surfaces δ of the aircraft 10, a previous estimated dynamic pressure $Q_{bar(p)}$ determined in an iteration immediately before the present iteration, and the estimated Mach number $M_{MDL}$. It is to be appreciated that at the very beginning of a simulation, the previous estimated dynamic pressure $Q_{bar(p)}$ is set to the measured dynamic pressure $Q_{bar(m)}$.

The coefficient submodule 200 determines the drag coefficient $C_D$ and the lift coefficient $C_L$ based on one or more coefficient three-dimensional look-up tables 220. The coefficient three-dimensional look-up tables 220 provide a drag coefficient $C_D$ and a lift coefficient $C_L$ value based on specific values of the plurality of first operating parameters (angle of attack α, the deflection of the control surfaces δ of the aircraft 10, the previous estimated dynamic pressure $Q_{bar(p)}$, and the estimated Mach number $M_{MDL}$). The coefficient three-dimensional tables 220 are derived from data collected during testing (e.g., wind-tunnel test data) and data collected during flight testing. The coefficient three-dimensional look-up tables 220 are stored on one or more propulsion databases 222. It is to be appreciated that while the databases 222 are shown as part of the EKF control module 122, the databases 222 may be located in a location remote from the EKF control module 122 as well, and the embodiment as shown in FIG. 6 is intended to illustrate only an example of where the three-dimensional look-up tables may be stored.

It is to be appreciated that the coefficient three-dimensional look-up tables 220 are based on lift and drag values for the individual control surfaces of the aircraft 10 (e.g., the leading edge slats 88, the trailing edge flaps 90, the spoilers 92, the ailerons 98, the vertical stabilizer 106, the horizontal stabilizers 108, the rudder 110, and the elevator 114). Each control surface includes look-up tables for low speed conditions (i.e., having an estimated Mach number of less than 0.4) and for high speed conditions (i.e., an estimated Mach number of 0.4 or more). Furthermore, each control surface is associated with individual look-up tables for the drag coefficient and the lift coefficient. All of the look-up tables may be influenced by various operating parameters of the aircraft 10 such as, for example, the altitude or the angle of attack. All of the individual look-up tables are combined to determine the drag coefficients and lift coefficients listed in the coefficient three-dimensional look-up tables 220.

The propulsion submodule 202 receives as input a plurality of second operating parameters of the aircraft 10. Specifically, the plurality of second operating parameters of the aircraft 10 include the barometric altitude, the pitch angle $\Theta$, the total air temperature $T_{TOT}$, the engine speed N1 of both aircraft engines 78 (FIG. 2), and the static pressure $P_S$. The propulsion submodule 202 determines an estimated net thrust T of the aircraft 10 based on the plurality of second operating parameters. More specifically, the propulsion submodule 202 determines the estimated net thrust T of the aircraft 10 based on propulsion-based three-dimensional look-up tables 230 that provide the estimated net thrust T based on specific values of the barometric altitude, pitch angle $\Theta$, the total air temperature $T_{TOT}$, the engine speed N1 of both aircraft engines 78 (FIG. 2), and the static pressure $P_S$. The three-dimensional look-up tables 230 are generated based on simulations performed for the specific type or model of the aircraft 10. The three-dimensional look-up tables 230 are stored on one or more propulsion databases 232.

The measurement submodule 204 receives as input the drag coefficient $C_D$, the lift coefficient $C_L$, and the estimated net thrust T. The measurement submodule 204 determines the estimated acceleration $Ax_{(est)}$ and the estimated acceleration $Az_{(est)}$ based on the drag coefficient $C_D$, the lift coefficient $C_L$, and the estimated net thrust T. Specifically, the measurement submodule 204 solves for the estimated accelerations $Ax_{(est)}$, $Az_{(est)}$ based on an equation of motion that expresses an equivalent force acting upon the aircraft 10. The equation of motion is expressed in Equation 3 as:

$$\begin{bmatrix} A_D(\hat{x}) \\ A_L(\hat{x}) \end{bmatrix} = \frac{S}{m} \begin{bmatrix} C_D(\alpha, \hat{x}, P_S) \\ C_L(\alpha, \hat{x}, P_S) \end{bmatrix} \hat{x} - \frac{1}{m} R_a^T \begin{bmatrix} X_T(h_j t, N_{1c}, \hat{x}, P_S) \\ Z_T(h_j t, N_{1c}, \hat{x}, P_S) \end{bmatrix} \quad \text{Equation 3}$$

where $A_D$ is the drag acceleration, $A_L$ is the lift acceleration, S is the reference area of a wing planform, m is the mass of the aircraft 10, $\alpha$ is the angle of attack, $P_S$ is the static pressure, $R_\alpha^T$ is a rotational matrix of the forward stability-axis $X_S$ relative to the body-axis $X_B$ and the body-axis $Z_B$ of the aircraft 10 (FIG. 7), $X_T$ is thrust force in relative to a body-axis $X_B$ of the aircraft 10, $Y_T$ is thrust force in relative to a body-axis $Y_B$ of the aircraft 10, $h_{ft}$ is the barometric altitude, $N_{1c}$ is engine speed (corrected for temperature), and x is a state vector. The drag acceleration $A_D$ is determined by subtracting the net thrust force of the body-axis $X_B$ from the drag force and dividing the result by the mass of the aircraft 10. The lift acceleration $A_L$ is determined by subtracting the net thrust force of the body-axis $Z_B$ from the lift force and dividing the result by the mass of the aircraft 10.

The error submodule 206 receives as input the estimated lateral acceleration $Ax_{(est)}$, the estimated vertical acceleration $Az_{(est)}$, the measured lateral acceleration factor $Ax_{(mea)}$, and the measured vertical acceleration factor $Az_{(mea)}$. The error submodule 206 determines the acceleration error value E by determining a first difference between the estimated longitudinal acceleration $Ax_{(est)}$ and the estimated vertical acceleration $Az_{(est)}$ and a second difference between the measured longitudinal acceleration $Ax_{(mea)}$ and the measured vertical acceleration $Az_{(mea)}$.

The Kalman gain submodule 208 receives as input the acceleration error value E from the error submodule 206. The Kalman gain submodule 208 determines the residual Kalman value by multiplying the acceleration error value E for the first difference and the second difference with the Kalman gain value K.

The dynamic submodule 210 receives as input the barometric altitude, the angle of attack $\alpha$, the pitch angle $\Theta$, the estimated dynamic pressure $Q_{bar(e)}$, and the estimated longitudinal acceleration $Ax_{(est)}$ of the aircraft 10. The dynamic submodule 210 determines the estimated rate of change of the dynamic pressure $\dot{Q}_{bar(e)}$ based on the input. Specifically, the estimated rate of change of the dynamic pressure $\dot{Q}_{bar(e)}$ is determined based on Equation 2, which is described above.

The integration submodule 212 receives as input the residual Kalman value from the multiplier 160 and the estimated rate of change of the dynamic pressure $\dot{Q}_{bar(e)}$ from the dynamic control module 152. The integration submodule 212 combines the residual Kalman value with the estimated rate of change of the dynamic pressure $\dot{Q}_{bar(e)}$ together, and then integrates the sum of the residual Kalman value and the estimated rate of change of the dynamic pressure $\dot{Q}_{bar(e)}$, which results in the estimated dynamic pressure $Q_{bar(e)}$. It is to be appreciated that the estimated dynamic pressure $Q_{bar(e)}$ provides improved accuracy when compared to dynamic pressure values that are calculated using conventional approaches.

Referring to both FIGS. 3 and 6, the CMM 126 receives as input the measured dynamic pressure $Q_{bar(e)}$ and the estimated dynamic pressure $Q_{bar(e)}$. The CMM 126 compares the measured dynamic pressure $Q_{bar(m)}$ and the estimated dynamic pressure $Q_{bar(e)}$ with one another to determine a difference. In response to determining the difference between the measured dynamic pressure $Q_{bar(m)}$ and the estimated dynamic pressure $Q_{bar(e)}$ exceeds the threshold value for the threshold amount of time, the CMM 126 determines a fault. It is to be appreciated that the disclosed CMM 126 detects faults with improved accuracy when compared to existing CMM systems. The improved accuracy of the CMM 126 results in fewer false or spurious alarms that are created by the flight control system 18.

Figure 8:
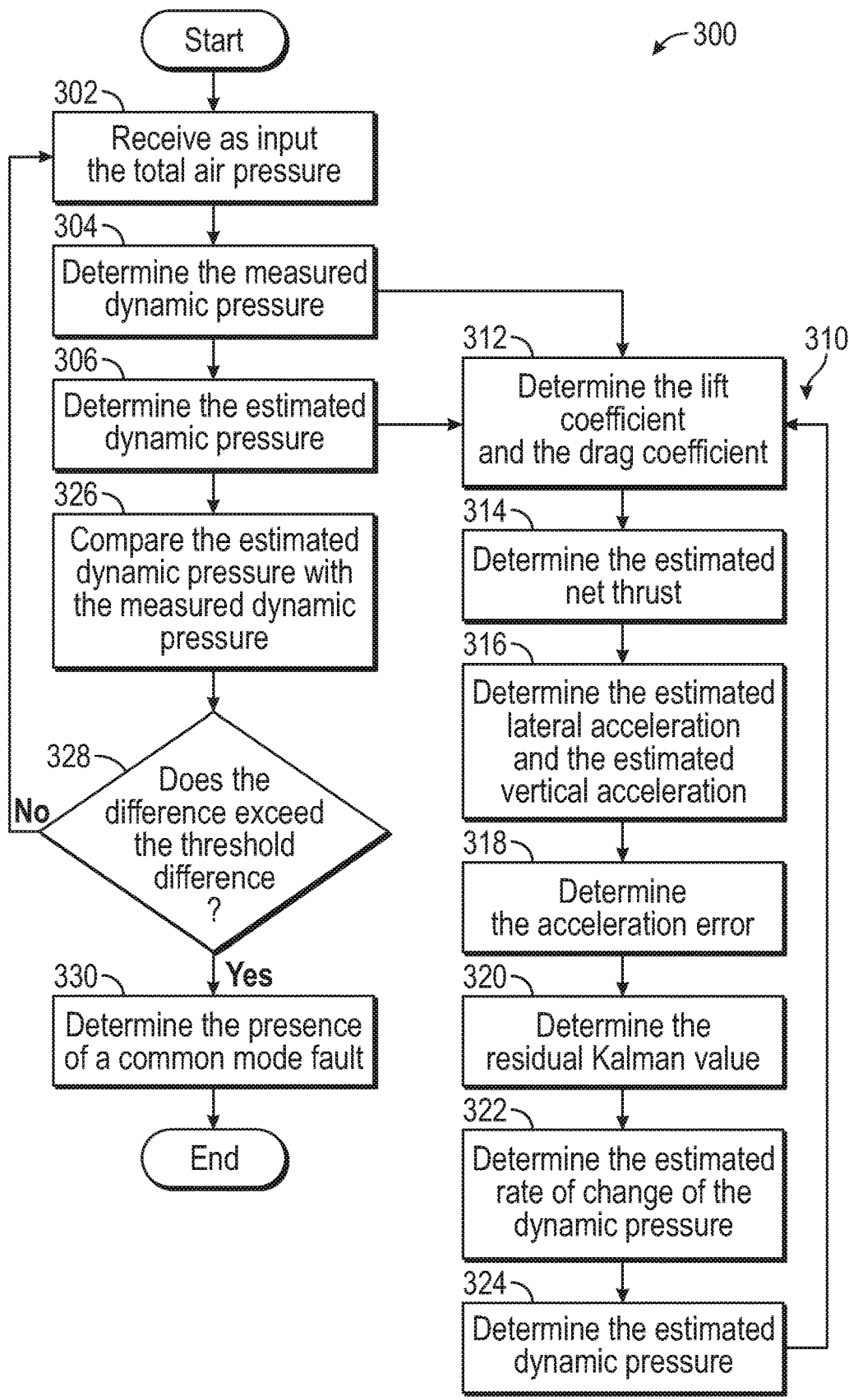
FIG. 8 is a process flow diagram illustrating an exemplary method for detecting a fault by a common mode monitoring system based on the estimated dynamic pressure according to an exemplary embodiment.

FIG. 8 is an exemplary process flow diagram illustrating a method 300 for determining a fault by the CMM 126 based on the estimated dynamic pressure $Q_{bar(e)}$. Referring to FIGS. 1, 2, 3, 6, and 8, the method 300 begins at block 302. In block 302, the air data reference function block 120 receives as input the total air pressure $P_{TOT}$ from the plurality of pitot tubes 40. The method 300 may then proceed to block 304.

In block 304, the air data reference function block 120 determines the measured dynamic pressure $Q_{bar(m)}$ based on the total air pressure $P_{TOT}$ from the plurality of pitot tubes 40 and the static pressure $P_S$. The method 300 may then proceed to block 306.

In block 306, the EKF control module 122 determines the estimated dynamic pressure $Q_{bar(e)}$. Specifically, the method 300 includes subroutine or method 310, which is performed recursively to determine the estimated dynamic pressure $Q_{bar(e)}$.

The method 310 includes blocks 312, 314, 316, 318, 320, 322, and 324. In block 312, the EKF control module 122 determines the drag coefficient $C_D$ and the lift coefficient $C_L$ based on the plurality of first operating parameters. The method 310 then proceeds to block 314, where the EKF control module 122 determines the estimated net thrust T of the aircraft 10 based on the plurality of second operating parameters of the aircraft 10. The method 310 then proceeds to block 316, where the EKF control module 122 determines the estimated acceleration $Ax_{(est)}$ and the estimated acceleration $Az_{(est)}$ based on the drag coefficient $C_D$, the lift coefficient $C_L$, and the estimated net thrust T. The method then proceeds to block 318, where the EKF control module 122 determines the acceleration error value E for the first difference between the estimated longitudinal acceleration $Ax_{(est)}$ and the estimated vertical acceleration $Az_{(est)}$ and the second difference between the measured longitudinal acceleration Ax(mea) and the measured vertical acceleration $Az_{(mea)}$. The method 310 then proceeds to block 320, where the EKF control module 122 determines the residual Kalman value by multiplying the acceleration error value E with the Kalman gain value K. The method 310 then proceeds to block 322, where the EKF control module 122 determines the estimated rate of change of the dynamic pressure $\dot{Q}_{bar(e)}$ based on the estimated longitudinal acceleration $Ax_{(est)}$ of the aircraft 10. The method 310 may then proceed to block 324. In block 324, the residual Kalman value is combined with the estimated rate of change of the dynamic pressure $\dot{Q}_{bar(e)}$ together, and the sum of the residual Kalman value and the estimated rate of change of the dynamic pressure $\dot{Q}_{bar(e)}$ are integrated to determine the estimated dynamic pressure $Q_{bar(e)}$. The method 310 may then return to block 312.

Once the estimated dynamic pressure $Q_{bar(e)}$ is determined, the method 300 may proceed to block 326. In block 326, the CMM 126 compares the measured dynamic pressure $Q_{bar(m)}$ and the estimated dynamic pressure $Q_{bar(e)}$ with one another to determine a difference. The method 300 may then proceed to block 328.

In block 328, if the difference between the measured dynamic pressure $Q_{bar(m)}$ and the estimated dynamic pressure $Q_{bar(e)}$ does not exceed the threshold value for the threshold amount of time, then the CMM 126 determines no fault has occurred. The method 300 may then return back to block 302. However, in response to determining the difference between the measured dynamic pressure $Q_{bar(e)}$ and the estimated dynamic pressure $Q_{bar(e)}$ exceeds the threshold value for the threshold amount of time, the method 300 proceeds to block 330.

In block 330, the CMM 126 determines the presence of a common mode fault of the measured dynamic pressure $Q_{bar(m)}$. The flight control system 18 then switches from the normal mode of operation as shown in FIG. 3 and into the extended normal mode of operation shown in FIG. 4. The method 300 may then terminate.

Referring generally to FIGS. 1-9, the disclosed flight control system determines the estimated dynamic pressure based on both the coefficient of lift and the coefficient of drag, which results in improved accuracy. The enhanced accuracy of the estimated dynamic pressure results in fewer spurious alarms generated by the common mode monitor when compared to conventional systems. As a result, there is a reduced occurrence of the aircraft needlessly switching from the normal mode of operation and into the secondary mode of operation. Furthermore, the estimated dynamic pressure also supports full envelope operation of the aircraft.

Figure 9:
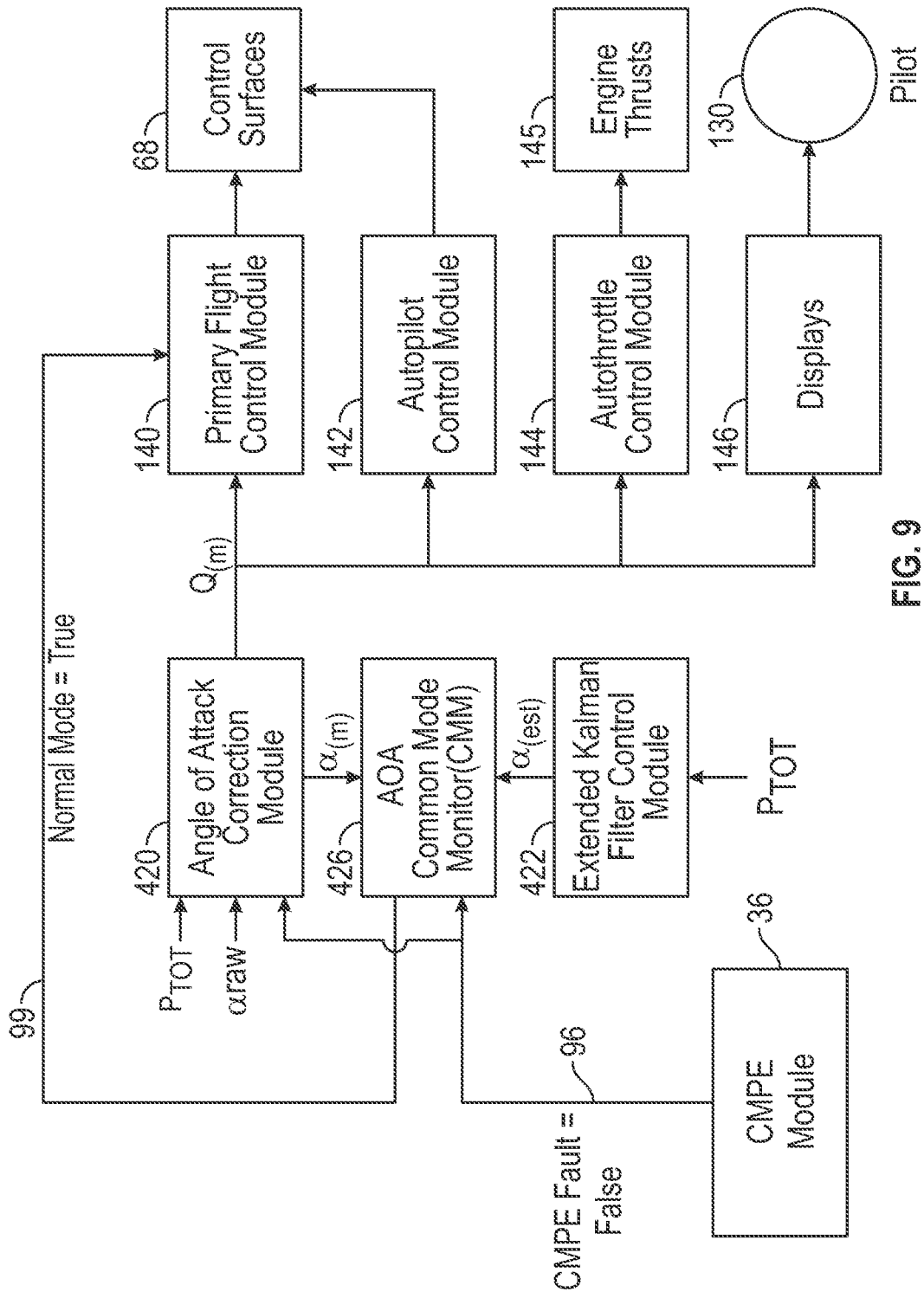
FIG. 9 is a flowchart illustrating the flight control system during a normal mode of operation, where a measured angle of attack is used according to an exemplary embodiment.

Referring now to FIGS. 1 and 9, in another embodiment the flight control module 16 is configured to detect a fault based on a value used for the angle of attack value. In response to detecting a fault, the flight control module 16 determines a synthetic or estimated value for the angle of attack that is not based on the values measured by the plurality of angle of attack sensors 60. More specifically, the flight control module 16 receives as input a measured angle of attack $\alpha_m$, where the measured angle of attack $\alpha_m$ is based on measurements from the plurality of angle of attack sensors 60 of the aircraft 10. The flight control module 16 also receives as input an estimated angle of attack $\alpha_{est}$. Unlike the measured angle of attack $\alpha_m$, the estimated angle of attack $\alpha_{est}$ is determined without using measurements from the plurality of angle of attack sensors 60. Instead, the estimated angle of attack $\alpha_{est}$ is determined based on the total pressure $P_{TOT}$ measured by the plurality of pitot tubes 40 (FIG. 2).

The flight control module 16 compares the measured angle of attack $\alpha_m$ with the estimated angle of attack $\alpha_{est}$ to determine an error. In response to determining that the error between the measured angle of attack $\alpha_m$ and the estimated angle of attack $\alpha_{est}$ exceeds a threshold value, the flight control module 16 determines the presence of a fault with an angle of attack value. In some embodiments, the plurality of angle of attack sensors 60 create the fault. Some examples of events that may create a fault with the plurality of angle of attack sensors 60 include, for example, debris that impacts the plurality of angle of attack sensors 60 or, alternatively, icing makes the angle of attack resolver (not shown) stick.

The flight control module 16 provides synthetic values representing the angle of attack of the aircraft 10 in response to determining a majority of the angle of attack sensors 60 are not providing accurate data. Specifically, as explained below, new values for the true air speed of the aircraft $Vt_{MDL}$ and the estimated Mach number $M_{MDL}$ need to be re-calculated using the estimated dynamic pressure $Q_{bar(e)}$. This is because the values for the true air speed of the aircraft $Vt_{MDL}$ and the estimated Mach number $M_{MDL}$ are erroneously low during a common mode pneumatic event.

Referring now to FIG. 9, an angle of attack correction module 420 is configured to correct the bias introduced by the plurality of angle of attack sensors 60. Specifically, the plurality of angle of attack sensors 60 (FIG. 2) are configured to measure a raw angle of attack $\alpha_{raw}$ using a self-aligning vane. Each angle of attack sensor 60 provides a unique raw angle of attack $\alpha_{raw}$ value. One of the raw angle of attack $\alpha_{raw}$ values is selected based on signal selection and failure detection (SSFD) logic. SSFD logic is configured to select a single value from a set of redundant sensors, where the selected value is most likely to be representative of the actual value of the operative parameter measured by sensors. It is to be appreciated that the raw angle of attack $\alpha_{raw}$, which is measured directly by the plurality of angle of attack sensors 60, represents a local flow that needs to be adjusted by a correction factor. In one embodiment, the correction factor is about forty-five degrees. The corrected value for the raw angle of attack $\alpha_{raw}$ is referred to as the measured angle of attack $\alpha_m$.

The angle of attack correction module 420 receives as input the raw angle of attack $\alpha_{raw}$ and the total air pressure $P_{TOT}$ measured by the plurality of pitot tubes 40 (FIG. 2). The angle of attack correction module 420 determines the measured angle of attack $\alpha_m$ based on a moment arm correction term, (i.e., the correction term based on the self-aligning vane), the raw angle of attack $\alpha_{raw}$, the true air speed of the aircraft $Vt_{MDL}$, and the estimated Mach number $M_{MDL}$. The true air speed of the aircraft $Vt_{MDL}$, and the estimated Mach number $M_{MDL}$ are determined based on the total pressure $P_{TOT}$.

It is to be appreciated that during a common mode pneumatic event as explained above, the values for true air speed of the aircraft $Vt_{MDL}$ and the estimated Mach number $M_{MDL}$ are re-calculated using the estimated dynamic pressure $Q_{bar(e)}$. Specifically, in response to the CMM 126 (FIGS. 3 and 4) determining the difference between the measured dynamic pressure $Q_{bar(m)}$ and the estimated dynamic pressure $Q_{bar(e)}$ exceeds a threshold value for a threshold amount of time, the CMM 126 determines the presence of a common mode fault of the measured dynamic pressure $Q_{bar(m)}$. Once the common mode pneumatic event is determined, then the angle of attack correction module 420 determines the measured angle of attack $\alpha_m$ based on the estimated dynamic pressure ($Q_{bar(e)}$). Specifically, the angle of attack correction module 420 is determined based on a synthetic Mach number $M_{EKF}$ (Equation 4) and a synthetic true air speed of the aircraft $Vt_{EKF}$ (Equation 5):

$$M_{EKF} = \sqrt{\frac{Q_{bar(e)}}{0.7 \times ps}} \quad \text{Equation 4}$$

$$Vt_{EKF} = \sqrt{\frac{2 \times Q_{bar(e)}}{\rho}} \quad \text{Equation 5}$$

Figure 11:
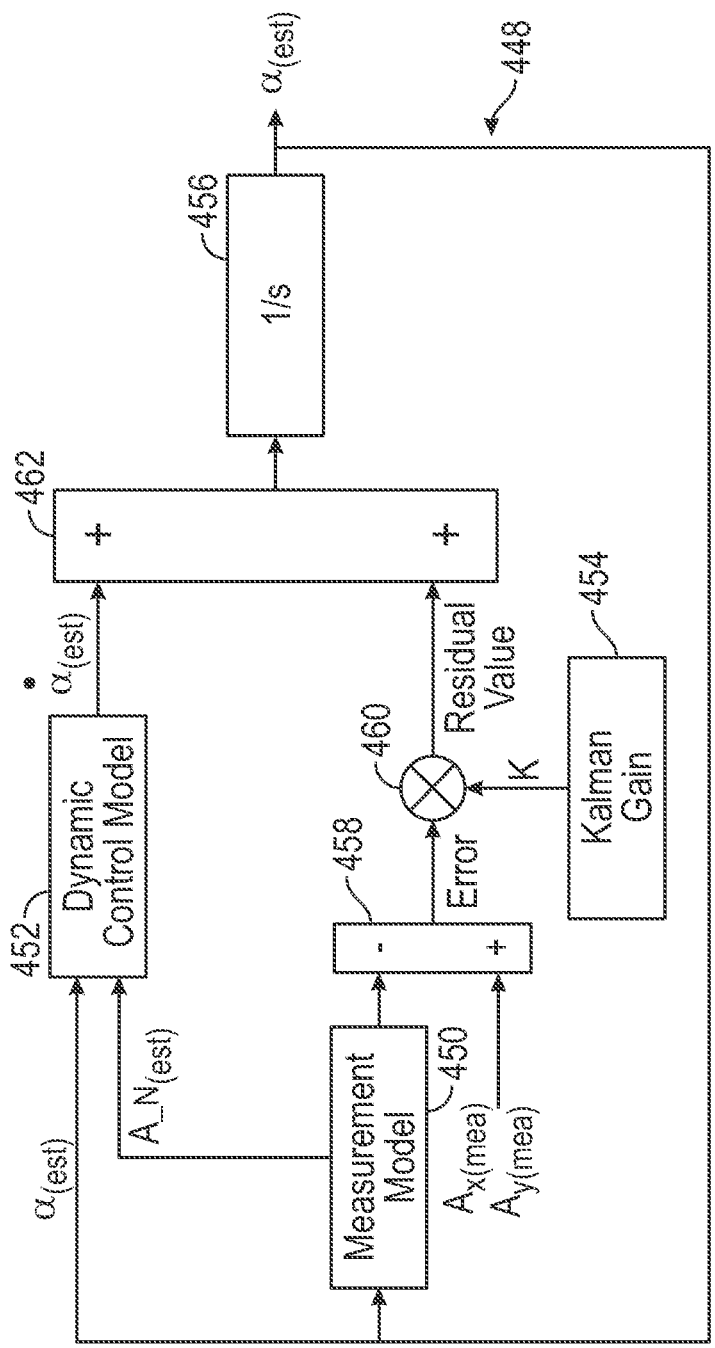
FIG. 11 is a block diagram of an extended Kalman filter for determining an estimated angle of attack according to an exemplary embodiment.
Figure 12:
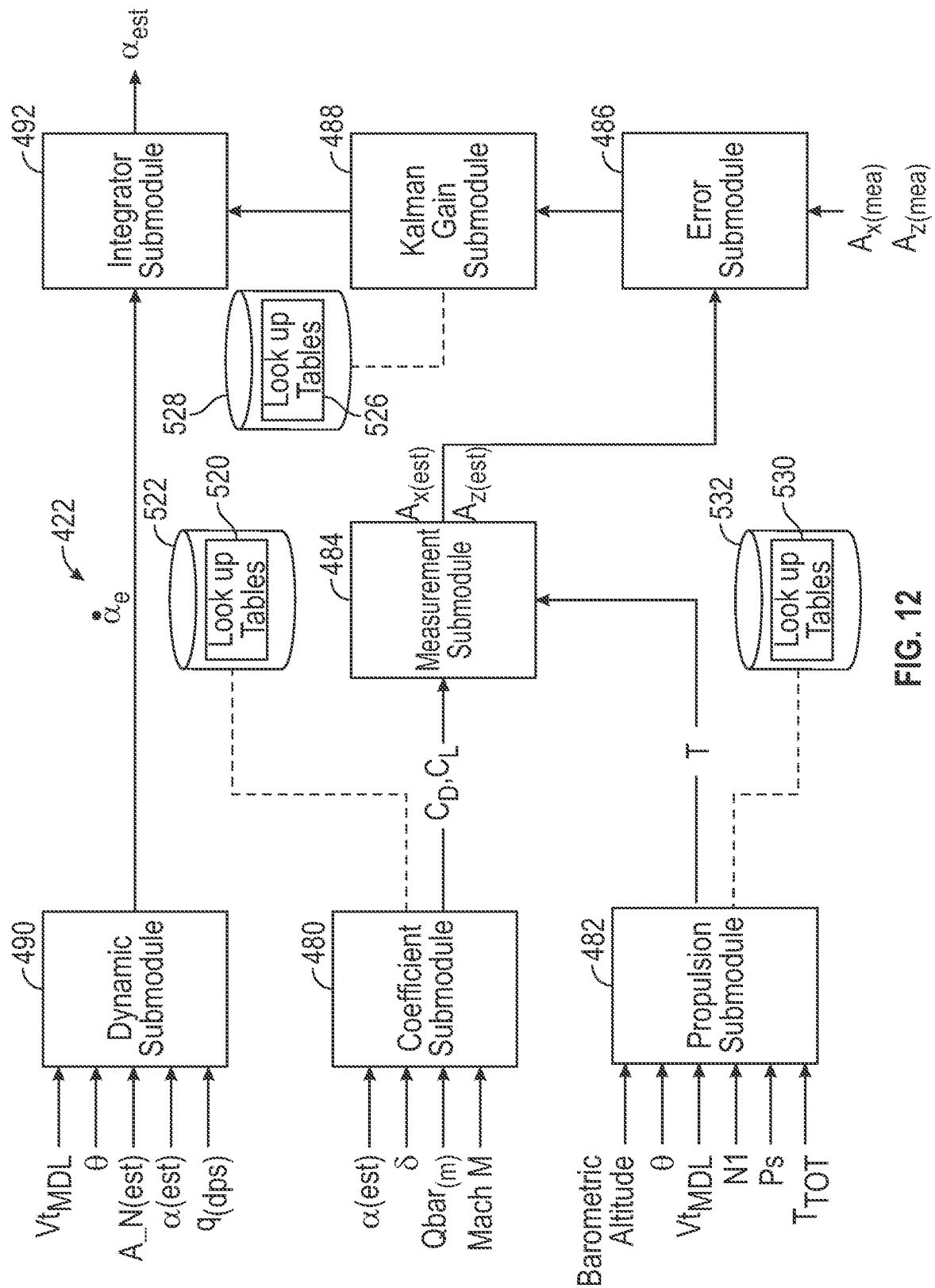
FIG. 12 illustrates a control module for determining the estimated angle of attack according to an exemplary embodiment.

Continuing to refer to FIG. 9, an extended Kalman filter (EKF) control module 422 is configured to determine the estimated angle of attack $\alpha_{est}$, which is described in greater detail below and is shown in FIGS. 11 and 12. However, it is to be appreciated that unlike the measured angle of attack $\alpha_m$, the estimated angle of attack $\alpha_{est}$ is not based on measurements obtained by the plurality of angle of attack sensors 60. An angle of attack common mode monitor CMM 426, which is referred to as the CMM 426, receives as input the measured angle of attack $\alpha_m$, the estimated angle of attack $\alpha_{est}$, and the output 96 from the CMPE control module 36. The CMM 426 determines a common mode failure, which is also referred to as a fault. Specifically, the CMM 426 determines a fault has occurred when the error between the measured angle of attack $\alpha_m$ and the estimated angle of attack $\alpha_{est}$ exceeds the threshold value for a threshold amount of time.

The threshold value is determined based on the accuracy of the plurality of angle of attack sensors 60 (i.e., a relatively high rate of accuracy results in a relatively low threshold value). For example, a relatively slow error rate may be about fifteen seconds while a relatively fast error rate includes a much longer persistence of about fifteen seconds. However, it is to be appreciated that other values may be used as well.

Figure 10:
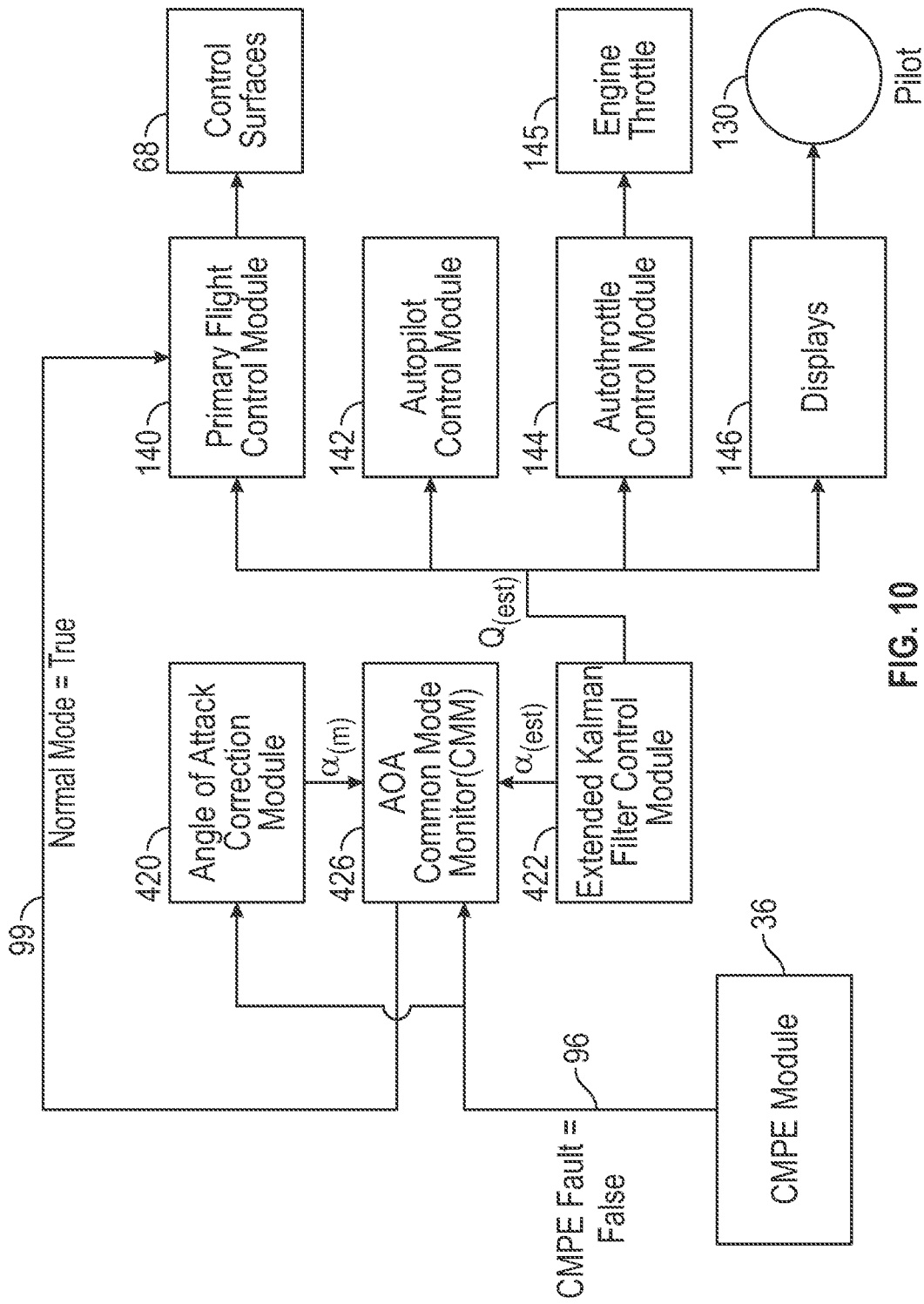
FIG. 10 is a flowchart of the flight control system shown in FIG. 9 utilizing an estimated angle of attack instead of the measured angle of attack in response to detecting a fault according to an exemplary embodiment.

FIG. 9 illustrates a non-fault condition where no fault has been detected by the CMM 426. Accordingly, the measured angle of attack $\alpha_m$ is received as input by the primary flight control module 140, the autopilot control module 142, the autothrottle control module 144, and the plurality of displays 146. It should also be appreciated that the aircraft 10 is operating in the normal mode of operation. FIG. 10 illustrates a fault condition detected by the CMM 426. In response to the CMM 426 detecting a fault with respect to the angle of attack value, the estimated angle of attack $\alpha_{est}$ is provided to the primary flight control module 140, the autopilot control module 142, the autothrottle control module 144, and the plurality of displays 146. In the embodiments as shown in FIGS. 9 and 10, no common mode failure of the estimated dynamic pressure $Q_{bar(e)}$ exists (i.e., a majority of the plurality of pitot tubes 40 are not blocked). Thus, the output 96 generated by the CMPE control module 36 is set to a FALSE value (i.e., CMPE FAULT=FALSE). However, in response to detecting a common mode failure, the values for true air speed of the aircraft $Vt_{MDL}$ and the estimated Mach number $M_{MDL}$ may no longer be accurate. Instead, the angle of attack correction module 420 uses the synthetic Mach number $M_{EKF}$ (Equation 4) and the synthetic true air speed of the aircraft $Vt_{EKF}$ (Equation 5) to preserve the estimated angle of attack $\alpha_{est}$ signal that is used by the flight control module 140.

FIG. 11 is a block diagram of an extended Kalman filter of the EKF control module 422. The block diagram represents a system 448 for determining the estimated angle of attack $\alpha_{est}$ based on data collected from the air data sensors 22 (FIG. 1). The EKF control module 422 includes a measurement model 450, a dynamic control module 452, a Kalman gain block 454, an integrator block 456, an error block 458, a multiplier 460, and an adder 462. Similar to the measurement model 150 shown in FIG. 5, the measurement model 450 predicts expected values of measured accelerations (e.g., the measured longitudinal acceleration $Ax_{(mea)}$ and the measured vertical acceleration $Az_{(mea)}$) based on Equation 1 (shown above).

The dynamic control module 452 determines a rate of change for the estimated angle of attack, which is referred to as an estimated rate of change of the angle of attack $\dot{\alpha}_{(e)}$. The estimated rate of change of the angle of attack $\dot{\alpha}_{(e)}$ is determined based on an estimated normal acceleration component $A\_N_{(est)}$ of the aircraft 10, where the estimated normal acceleration component $A\_N_{(est)}$ is the vertical acceleration in a stability frame of the aircraft 10. Specifically, the estimated rate of change of the angle of attack $\dot{\alpha}_{(e)}$ is a function of a pitch $q_{(dps)}$, the true air speed of the aircraft $Vt_{MDL}$, the pitch angle $\Theta$, the estimated normal acceleration component $A\_N_{(est)}$, and the estimated angle of attack $\alpha_{est}$. In one embodiment, the estimated rate of change of the estimated angle of attack $\alpha_{est}$ is determined based on Equation 6, which is:

$$\dot{a}_{est} = q_{(dps)} + [(\cos(\theta - a)) \times g - A_{N(est)}] \cdot \frac{1}{Vt_{MDL}} \quad \text{Equation 6}$$

where g represents the gravitational constant.

The Kalman gain block 454 stores the Kalman gain value K. Similar to the embodiment as shown in FIG. 5, the Kalman gain value K represents the weight given to the current state of the aircraft 10 (i.e., the operating conditions), and is a dynamic value that is determined by a set of look-up tables 526 (seen in FIG. 12) stored on a database 528. The error block 458 receives as input the estimated longitudinal acceleration $Ax_{(est)}$ and an estimated vertical acceleration $Az_{(est)}$ from the measurement model 450 as well as the measured longitudinal acceleration $Ax_{(mea)}$ and the measured vertical acceleration $Az_{(mea)}$, and determines the acceleration error value E by determining a first difference between the estimated longitudinal acceleration $Ax_{(est)}$ and the estimated vertical acceleration $Az_{(est)}$ and a second difference between the measured longitudinal acceleration $Ax_{(mea)}$ and the measured vertical acceleration $Az_{(mea)}$. The multiplier 460 receives as input the acceleration error value E and the Kalman gain value K, and determines an estimated state update by multiplying the acceleration error value E with and the Kalman gain value K.

The adder 462 receives as input the residual Kalman value from the multiplier 460 and the estimated rate of change of the angle of attack $\dot{\alpha}_{(e)}$ from the dynamic control module 452. The adder 462 combines the residual Kalman value with the estimated rate of change of the angle of attack $\dot{\alpha}_{(e)}$ together. The combined residual Kalman value and the estimated rate of change of the angle of attack $\dot{\alpha}_{(e)}$ are then sent to the integrator block 456. The integrator block 456 then integrates the sum of the residual Kalman value and the estimated rate of change of the angle of attack $\dot{\alpha}_{(e)}$ to determine the estimated angle of attack $\alpha_{est}$.

FIG. 12 is an illustration of the EKF control module 422 including a plurality of submodules 480, 482, 484, 486, 488, 490, 492. The submodules 480, 482, 484, 486, 488, 490, 492 are shown as distinct components, which may indicate the use of modular programming techniques. Referring now to both FIGS. 11 and 12, the EKF control module 422 and the system 448 correspond to one another. Specifically, a coefficient submodule 480 and a propulsion submodule 482 of the EKF control module 422 both correspond to the measurement model 450 of the system 448. A measurement submodule 484 of the EKF control module 422 corresponds to the adder 462 of the system 448. An error submodule 486 of the EKF control module 422 corresponds to the error block 458 of the system 448. A Kalman gain submodule 488 of the EKF control module 422 corresponds to the Kalman gain block 454 of the system 448. A dynamic submodule 490 of the EKF control module 422 corresponds to the dynamic control module 452 of the system 448. Finally, an integration submodule 492 corresponds to the integrator block 456 of the system 448.

The EKF control module 422 receives as input a plurality of operating parameters of the aircraft 10 (FIGS. 1 and 2). The operating parameters include, but are not limited to, the measured acceleration factors $Ax_{(mea)}$ and $Az_{(mea)}$, the pitch $q_{(dps)}$, true air speed of the aircraft $Vt_{MDL}$, the pitch angle Θ, the estimated normal acceleration component $A\_N_{(est)}$, the estimated angle of attack $\alpha_{est}$, the previous estimated dynamic pressure $Q_{bar(p)}$, the estimated Mach number $M_{MDL}$, the barometric altitude, the deflection of the control surfaces δ of the aircraft 10, the engine speed N1 of both aircraft engines 78 (FIG. 2), and the static pressure Ps. Similar to the coefficient submodule 200 shown in FIG. 6, the coefficient submodule 480 receives as input the plurality of first operating parameters that each represent an operating condition of the aircraft 10, which include the estimated angle of attack $\alpha_{est}$, the deflection of the control surfaces δ of the aircraft 10, the measured dynamic pressure $Q_{bar(m)}$, and a measured Mach number M. The coefficient submodule 480 determines the drag coefficient $C_D$ and the lift coefficient $C_L$ based on the plurality of first operating parameters and one or more coefficient three-dimensional look-up tables 520 stored in database 522. The coefficient three-dimensional look-up tables 520 provide a drag coefficient $C_D$ and a lift coefficient $C_L$ value based on specific values of the plurality of first operating parameters.

Similar to the propulsion submodule 202 shown in FIG. 6, the propulsion submodule 482 receives as input the plurality of second operating parameters of the aircraft 10, which include the barometric altitude, the pitch angle Θ, true air speed of the aircraft $Vt_{MDL}$, the engine speed N1 of both aircraft engines 78 (FIG. 2), the total air temperature $T_{TOT}$, and the static pressure Ps. The propulsion submodule 482 determines the estimated net thrust T of the aircraft 10 based on the plurality of second operating parameters and propulsion-based three-dimensional look-up tables 530 stored in database 532 that provide the estimated net thrust T based on specific values of the plurality of second operating parameters.

The measurement submodule 484 receives as input the drag coefficient $C_D$, the lift coefficient $C_L$, and the estimated net thrust T. The measurement submodule 484 determines the estimated acceleration $Ax_{(est)}$ and the estimated acceleration $Az_{(est)}$ based on the drag coefficient $C_D$, the lift coefficient $C_L$, and the estimated net thrust T based on the equation of motion is expressed in Equation 3 above.

The error submodule 486 receives as input the estimated lateral acceleration $Ax_{(est)}$, the estimated vertical acceleration $A_{(est)}$, the measured lateral acceleration factor $Ax_{(mea)}$, and the measured vertical acceleration factor $Az_{(mea)}$. The error submodule 486 determines the acceleration error value E by determining a first difference between the estimated longitudinal acceleration $Ax_{(est)}$ and the estimated vertical acceleration $Az_{(est)}$ and a second difference between the measured longitudinal acceleration $Ax_{(mea)}$ and the measured vertical acceleration $Az_{(mea)}$.

The Kalman gain submodule 488 receives as input the acceleration error value E from the error submodule 486. The Kalman gain submodule 488 determines the residual Kalman value by multiplying the acceleration error value E for the first difference and the second difference with the Kalman gain value K.

The dynamic submodule 490 receives as input the pitch $q_{(dps)}$, the true air speed of the aircraft $Vt_{MDL}$, the pitch angle θ, the estimated normal acceleration component $A\_N_{(est)}$, and the estimated angle of attack $\alpha_{est}$, and determines the estimated rate of change of the angle of attack $\dot{\alpha}_{(e)}$ based on Equation 6, which is described above. The integration submodule 492 receives as input the residual Kalman value from the multiplier 460 and the estimated rate of change of the angle of attack $\dot{\alpha}_{(e)}$ from the dynamic submodule 490. The integration submodule 492 combines the residual Kalman value with the estimated rate of change of the angle of attack $\dot{\alpha}_{(e)}$ together, and then integrates the sum of the residual Kalman value and estimated rate of change of the angle of attack $\dot{\alpha}_{(e)}$, which results in the estimated angle of attack $\alpha_{est}$.

Referring to FIG. 9, the CMM 426 receives as input the measured angle of attack $\alpha_m$ and the estimated angle of attack $\alpha_{est}$. The CMM 426 compares the measured angle of attack $\alpha_m$ and the estimated angle of attack $\alpha_{est}$ with one another to determine a difference. In response to determining the difference between the measured angle of attack $\alpha_m$ and the estimated angle of attack $\alpha_{est}$ exceeds the threshold value for the threshold amount of time, the CMM 426 determines there is a fault that affects the angle of attack value.

Figure 13:
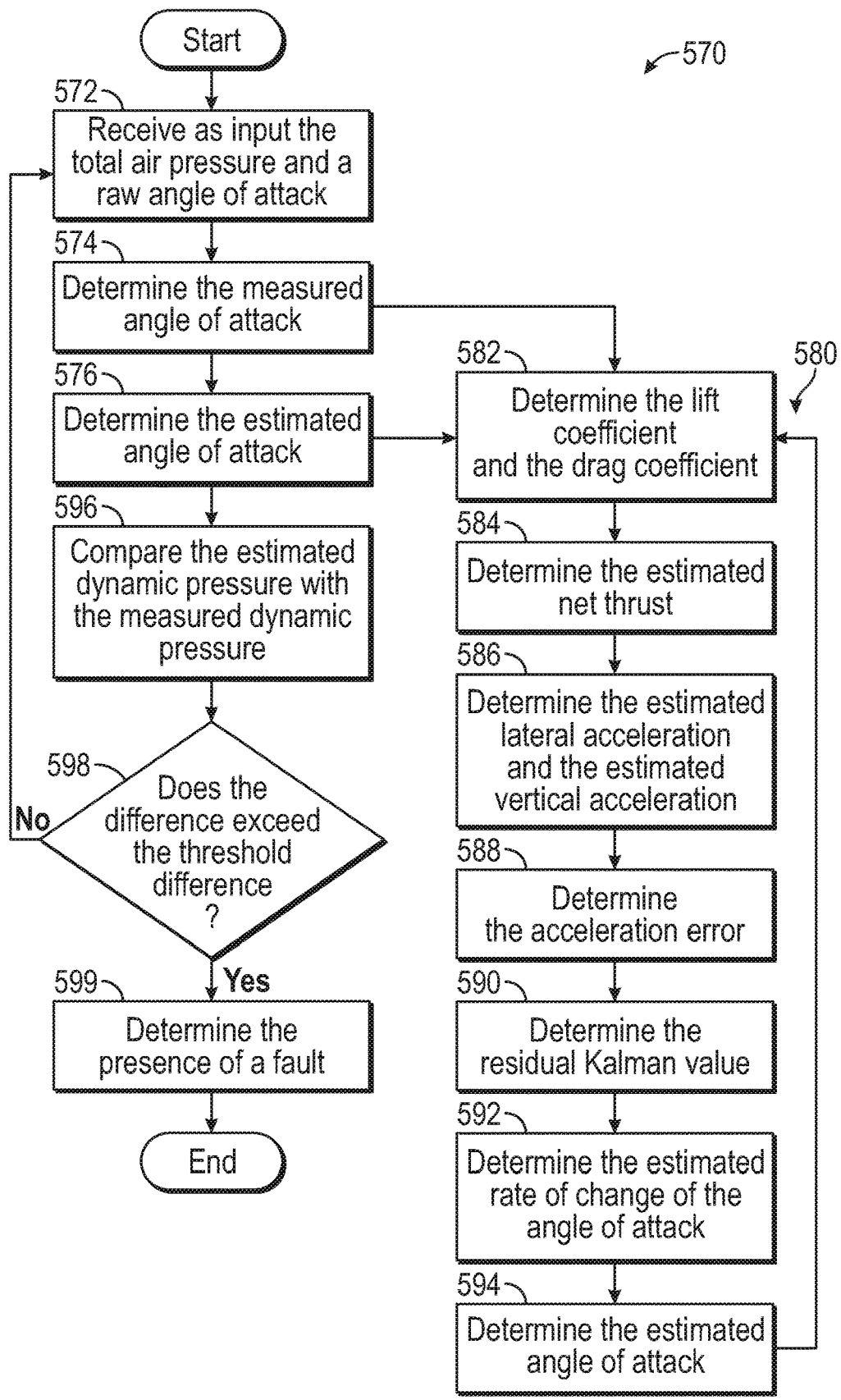
FIG. 13 is a process flow diagram illustrating an exemplary method of determining the estimated angle of attack according to an exemplary embodiment.

FIG. 13 is an exemplary process flow diagram illustrating a method 570 for determining a fault of the angle of attack value by the CMM 426. Referring to FIGS. 1, 9, 10, 11, 12 and 13, the method 570 begins at block 572. In block 572, the angle of attack correction module 420 receives as input the raw angle of attack $\alpha_{raw}$ and the total air pressure $P_{TOT}$ measured by the plurality of pitot tubes 40 (FIG. 2). The method 570 may then proceed to block 574.

In block 574, the angle of attack correction module 420 determines the measured angle of attack $\alpha_m$ based on a moment arm correction term, the raw angle of attack $\alpha_{raw}$, the synthetic true air speed of the aircraft $Vt_{EKF}$, and the estimated Mach number $M_{MDL}$. As mentioned above, during a common mode pneumatic event, the values for synthetic true air speed of the aircraft $Vt_{EKF}$ and the synthetic Mach number $M_{EKF}$ are calculated using the estimated dynamic pressure $Q_{bar(e)}$ (see Equations 4 and 5). The method 570 may then proceed to block 576.

In block 576, the EKF control module 422 determines the estimated angle of attack $\alpha_{est}$. Specifically, the method 570 includes subroutine or method 580. The method 580 is performed recursively to determine the estimated angle of attack $\alpha_{est}$.

The method 580 includes blocks 582, 584, 586, 588, 590, 592, and 594. In block 582, the EKF control module 422 determines the drag coefficient $C_D$ and the lift coefficient $C_L$ based on the plurality of first operating parameters. The method 580 then proceeds to block 584, where the EKF control module 422 determines the estimated net thrust T of the aircraft 10 based on the plurality of second operating parameters of the aircraft 10. The method 580 then proceeds to block 586, where the EKF control module 422 determines the estimated acceleration $Ax_{(est)}$ and the estimated acceleration $Az_{(est)}$ based on the drag coefficient $C_D$, the lift coefficient $C_L$, and the estimated net thrust T. The method 580 then proceeds to block 588, where the EKF control module 422 determines the acceleration error value E for the first difference between the estimated longitudinal acceleration $Ax_{(est)}$ and the estimated vertical acceleration $Az_{(est)}$ and the second difference between the measured longitudinal acceleration $Ax_{(mea)}$ and the measured vertical acceleration $Az_{(mea)}$. The method 580 then proceeds to block 590, where the EKF control module 422 determines the residual Kalman value by multiplying the acceleration error value E with the Kalman gain value K. The method 580 then proceeds to block 592, where the EKF control module 422 determines the estimated rate of change of the angle of attack $\dot{\alpha}_e$ based on the estimated normal acceleration component $A\_N_{(est)}$ of the aircraft 10. The method 580 may then proceed to block 594. In block 594, the residual Kalman value is combined with the estimated rate of change of the angle of attack $\dot{\alpha}_e$ together, and the sum of the residual Kalman value and the estimated rate of change of the angle of attack $\dot{\alpha}_e$ are integrated to determine the estimated angle of attack $\alpha_{est}$. The method 580 may then return to block 582.

Once the estimated angle of attack $\alpha_{est}$ is determined, the method 570 may proceed to block 596. In block 596, the CMM 426 compares the measured angle of attack $\alpha_m$ and the estimated angle of attack $\alpha_{est}$ with one another to determine the error. The method 580 may then proceed to block 598.

In block 598, if the error does not exceed the threshold value for the threshold amount of time, then the CMM 426 determines no fault has occurred. The method 570 may then return back to block 572. However, in response to determining the error exceeds the threshold value for the threshold amount of time, the method 570 proceeds to block 599.

In block 599, the CMM 426 determines the presence of a common mode fault of the angle of attack value. The flight control system 18 then switches from utilizing the measured angle of attack $\alpha_m$ (shown in FIG. 9) and instead uses the estimated angle of attack $\alpha_{est}$ (shown in FIG. 10). The method 570 may then terminate.

Referring generally to FIGS. 9-13, the disclosed system provides an approach for determining an estimated angle of attack that is independent from the measurements collected by the angle of attack sensors. Therefore, the system substitutes the estimated angle of attack in response to determining that the measured angle of attack is no longer useable. Furthermore, in the event a common mode pneumatic event is detected (i.e., a majority of the pitot tubes of the aircraft are blocked), the disclosed system also provides an approach for determining the measured angle of attack without using the for true air speed of the aircraft and the measured Mach number. It is to be appreciated that during a common mode pneumatic event the values for the true air speed of the aircraft and the estimated Mach number are erroneously low, and therefore any value determined based on these values may not be accurate. Accordingly, the system determines synthetic values for the true air speed of the aircraft and the estimated Mach number based on the estimated dynamic pressure.

Figure 14:
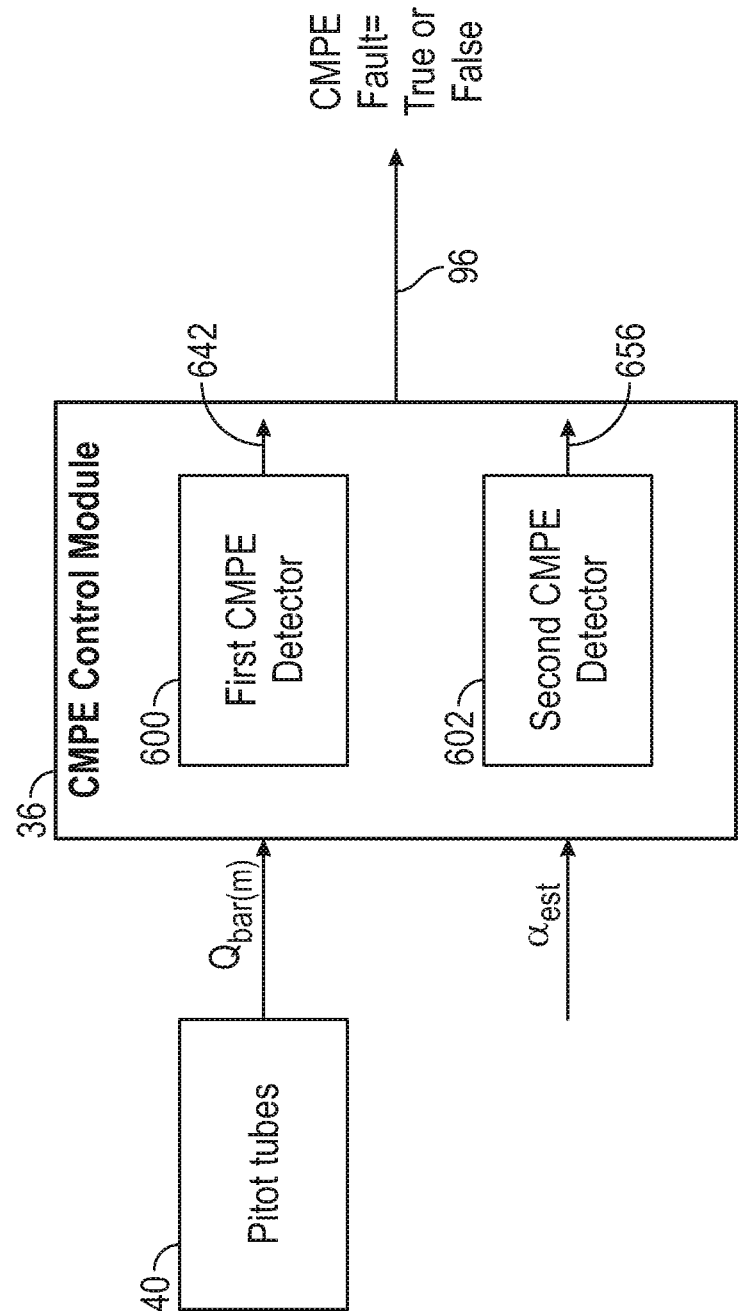
FIG. 14 is an illustration of a system for detecting the common mode pneumatic event based on the measured dynamic pressure and the angle of attack, where the system includes a first detector and a second detector according to an exemplary embodiment.

Detection of the common mode pneumatic event by the CMPE control module 36 shall now be described. Referring now to FIG. 14, the CMPE control module 36 receives as input the measured dynamic pressure $Q_{bar(m)}$ and the estimated angle of attack $\alpha_{est}$ and determines a common mode pneumatic event based on the input. More specifically, the CMPE control module 36 determines the presence of a common mode pneumatic event (e.g., CMPE FAULT=TRUE) in response to detecting either a synchronous fault or an asynchronous fault with the plurality of pitot tubes 40. It is to be appreciated that in the embodiments as described in FIGS. 14-18, the estimated angle of attack $\alpha_{est}$ is the value as described with reference to FIGS. 9-13 (i.e., the measured angle of attack is not used).

The CMPE control module 36 includes a first CMPE detector 600 and a second CMPE detector 602. The first CMPE detector 600 receives as input the measured dynamic pressure $Q_{bar(m)}$ and the estimated angle of attack $\alpha_{est}$ and determines a first common mode pneumatic event based on both inputs. More specifically, the first CMPE detector 600 is configured to detect the first common mode pneumatic event. The first common mode pneumatic event is a synchronous common mode pneumatic event based on a majority of the plurality of pitot tubes 40 experiencing a simultaneous failure. In contrast, the second CMPE detector 602 is configured to detect a second common mode pneumatic event, which is an asynchronous fault, based on only the measured dynamic pressure $Q_{bar(m)}$. An asynchronous fault is based on the plurality pitot tubes 40 failing at time intervals that are offset from one another during a specific interval of time. For example, an asynchronous fault occurs when one of the plurality of pitot tubes 40 fails first, then about two seconds later a second pitot tube 40 fails, and then a third pitot tube 40 fails about two seconds after the second pitot tube 40.

Figure 15:
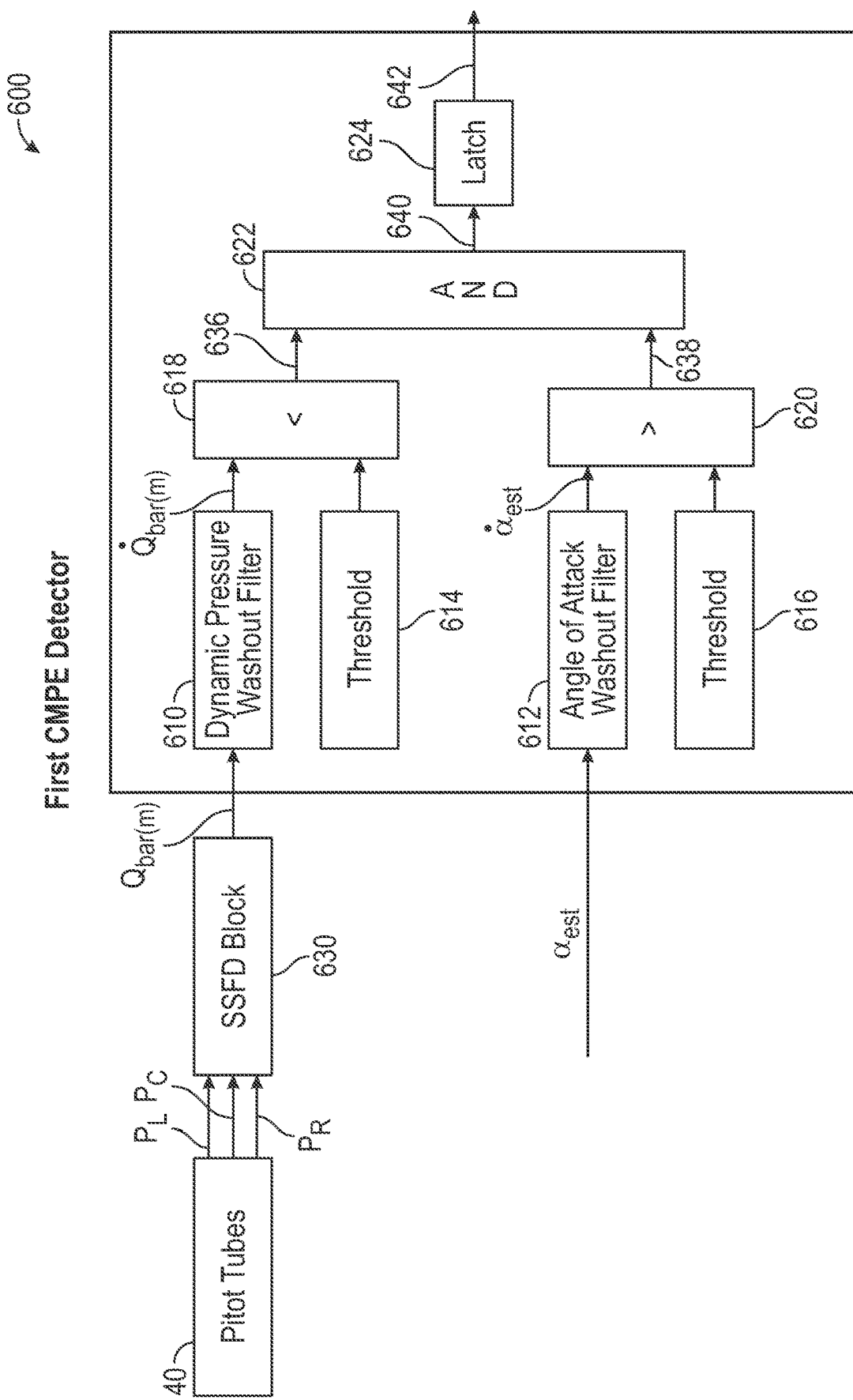
FIG. 15 is an illustration of the first detector of the system shown in FIG. 14 for detecting a synchronous fault of a plurality of pitot tubes according to an exemplary embodiment.

Referring now to FIG. 15, the first CMPE detector 600 is now described. The first CMPE detector 600 includes a measured dynamic pressure washout filter 610, an angle of attack washout filter 612, a dynamic pressure threshold value 614, an angle of attack threshold value 616, a dynamic pressure comparer 618, an angle of attack comparer 620, an AND block 622, and a latch 624. The first CMPE detector 600 generates an output signal 642 that is set to TRUE when the first common mode pneumatic event is detected and is set to FALSE when no common mode pneumatic event is detected.

The plurality of pitot tubes 40 are each configured to measure a pressure value P. For example, in the non-limiting embodiment as shown, three pressure values P are illustrated (i.e., a left pressure value $P_L$, a center pressure value $P_C$, and a right pressure value $P_R$). The pressure values $P_L$, $P_C$, $P_R$ from each pitot tube 40 are sent to a signal selection and failure detection (SSFD) block 630. SSFD logic is configured to select a single value from a set of redundant sensors. The selected value is most likely to be representative of the actual value of the operative parameter measured by sensors.

Thus, the SSFD block 630 is configured to select one of the pressure values $P_L$, $P_C$, $P_R$. The selected one of the pressure values $P_L$, $P_C$, $P_R$ is the most representative value of the measured dynamic pressure $Q_{bar(m)}$ when compared to the remaining pressure values $P_L$, $P_C$, $P_R$ measured by the plurality of pitot tubes 40. The measured dynamic pressure $Q_{bar(m)}$ is then received as input by the first CMPE detector 600.

The measured dynamic pressure washout filter 610 receives as input the measured dynamic pressure $Q_{bar(m)}$ and determines a rate of change of the measured dynamic pressure $Q_{bar(m)}$, which is referred to as $\dot{Q}_{bar(m)}$. Specifically, the measured dynamic pressure washout filter 610 operates as a high-pass filter that rejects steady-state values and passes transient values of the measured dynamic pressure $Q_{bar(m)}$ to determine the rate of change of the measured dynamic pressure $\dot{Q}_{bar(m)}$. The rate of change of the measured dynamic pressure $\dot{Q}_{bar(m)}$ is sent to the dynamic pressure comparer 618. The dynamic pressure comparer 618 receives as input the dynamic pressure threshold value 614 and the rate of change of the measured dynamic pressure $\dot{Q}_{bar(m)}$ and compares the values to one another. In response to determining that the rate of change of the measured dynamic pressure $\dot{Q}_{bar(m)}$ is less than the dynamic pressure threshold value 614, the dynamic pressure comparer 618 generates an output signal 636 indicating the rate of change of the measured dynamic pressure $\dot{Q}_{bar(m)}$ is within limits (e.g., a TRUE signal). However, in response to determining the rate of change of the measured dynamic pressure $\dot{Q}_{bar(m)}$ is equal to or greater than the dynamic pressure threshold value 614, the dynamic pressure comparer 618 generates a FALSE signal as the output signal 636.

The dynamic pressure threshold value 614 is representative of a rate of change experienced by the measured dynamic pressure $Q_{bar(m)}$ when a majority of the plurality of pitot tubes 40 experience a failure (e.g., are blocked). For example, in one embodiment, the rate of change or drop in measured dynamic pressure $Q_{bar(m)}$ is about negative 100 megabars per second (mBar/sec). The dynamic pressure threshold value 614 is determined based on quantitative assessment data collected from field use. More specifically, the dynamic pressure threshold value 614 is determined by analyzing data collected from previous synchronous common mode pneumatic events that occurred during operation of other aircraft. However, the estimated angle of attack threshold value 616 is determined based on data collected during a simulated synchronous common mode pneumatic event. A simulated synchronous common mode pneumatic event may refer to either a computer simulation as well as test data obtained from test bench data. The estimated angle of attack threshold value 616 is representative of the rate of change of the estimated angle of attack $\alpha_{est}$ when a majority of the plurality of pitot tubes 40 experience a failure. For example, in one embodiment, the rate of change or the step increase in the estimated angle of attack $\alpha_{est}$ is about +10 degrees/second.

The estimated angle of attack washout filter 612 receives as input the estimated angle of attack $\alpha_{est}$ and determines a rate of change of the estimated angle of attack $\dot{\alpha}_{est}$. The estimated angle of attack washout filter 612 operates as a high-pass filter that rejects steady-state values and passes transient values of the estimated angle of attack to determine the rate of change of the estimated angle of attack $\dot{\alpha}_{est}$. The estimated angle of attack comparer 620 receives as input the rate of change of the estimated angle of attack $\dot{\alpha}_{est}$ and the estimated angle of attack threshold value 616 and compares the values to one another. In response to determining that the rate of change of the estimated angle of attack $\dot{\alpha}_{est}$ is greater than the estimated angle of attack threshold value 616, the estimated angle of attack comparer 620 generates an output signal 638 to the AND block 622 indicating the rate of change of the estimated angle of attack $\dot{\alpha}_{est}$ is outside limits (e.g., a TRUE signal). In response to determining that the rate of change of the rate of change of the estimated angle of attack $\dot{\alpha}_{est}$ is greater than the estimated angle of attack threshold value 616, the estimated angle of attack comparer 620 generates a FALSE signal as the output signal 638.

The AND block 622 receives as input the output signal 636 from the dynamic pressure comparer 618 and the output signal 638 from the estimated angle of attack comparer 620. In response to both output signals 636, 638 being TRUE, the AND block 622 generates an output signal 640 that is sent to the latch 624. The output signal 640 indicates the first common mode pneumatic event is detected. More specifically, in response to determining the rate of change of the measured dynamic pressure $\dot{Q}_{bar(m)}$ is less than the dynamic pressure threshold value 614 and the rate of change of the rate of change of the estimated angle of attack $\dot{\alpha}_{est}$ is greater than the estimated angle of attack threshold value 616, the AND block 622 determines the first common mode pneumatic event has occurred. The first common mode pneumatic event is a synchronous common mode pneumatic event, which is determined based on a majority of the plurality of pitot tubes 40 experiencing a simultaneous failure.

In response to the output signal 640 indicating a common mode pneumatic event (e.g., TRUE), the latch 624 is set during the time delay. It is to be appreciated that during the time delay the latch 624 may be reset at any time in response to the measured dynamic pressure $Q_{bar(m)}$ being accurate. For example, if the measured dynamic pressure $Q_{bar(m)}$ is determined to be accurate at 26 seconds into the time delay, then the latch 624 is reset and the time delay ends. However, the latch 624 remains set when no reset signal is received. In other words, in response to the error between the measured dynamic pressure $Q_{bar(m)}$ and the estimated dynamic pressure $Q_{bar(e)}$ being below a threshold value, the latch 624 receives a reset signal. However, at the end of the time delay if the error between the measured dynamic pressure $Q_{bar(m)}$ and the estimated dynamic pressure $Q_{bar(e)}$ still exceeds the threshold value, then a persistent common mode pneumatic event is detected. Accordingly, the output signal 642 of the first CMPE detector 600 indicates the presence of the first common mode pneumatic event.

Figure 16:
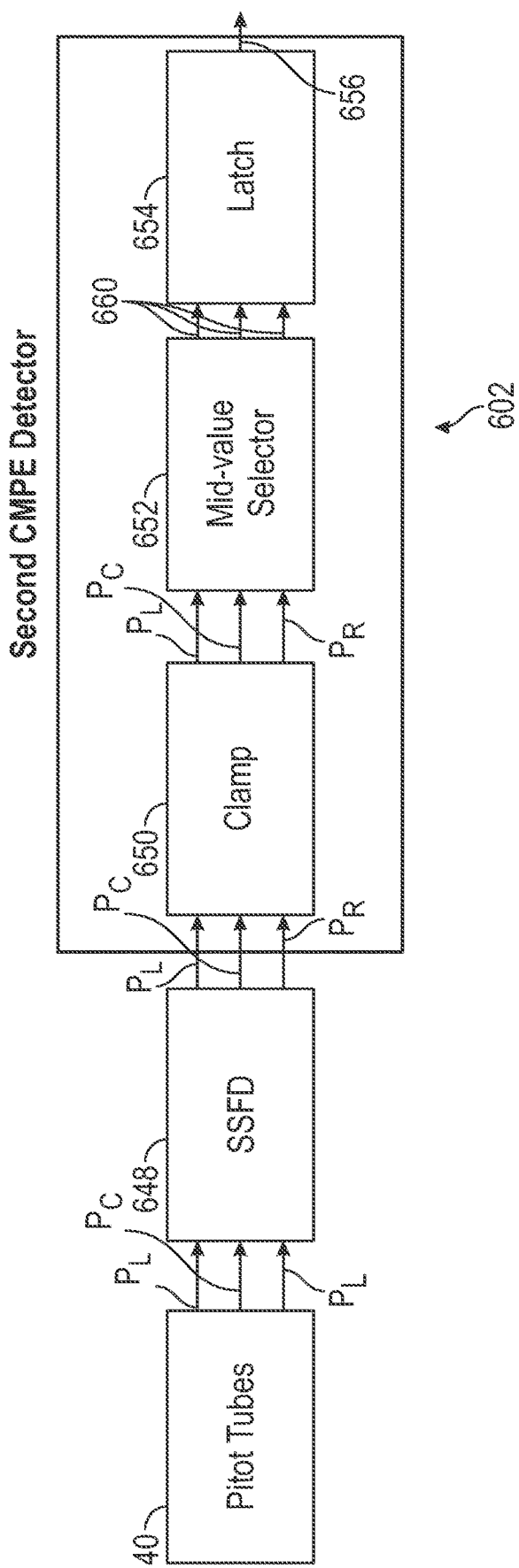
FIG. 16 is an illustration of the second detector of the system shown in FIG. 14 for detecting an asynchronous fault of the plurality of pitot tubes according to an exemplary embodiment.

Turning now to FIG. 16, the second CMPE detector 602 is now described. The second CMPE detector 602 incudes a clamp 650, a mid-value selector 652, and a latch 654 that generates an output signal 656. The second CMPE detector 602 is configured to detect the second common mode pneumatic event based on an asynchronous failure of the plurality of pitot tubes 40. More specifically, sometimes the plurality of pitot tubes 40 may not become non-operational at the same time. Instead, sometimes only a single pitot tube 40 may become blocked, and then a few seconds later another pitot tube 40 may become blocked.

Similar to the first CMPE detector 600, the pressure values (i.e., the left pressure value $P_L$, the center pressure value $P_C$, and the right pressure value $P_R$) from each of the plurality of pitot tubes 40 are sent to a SSFD block 648. The SSFD block 648 receives as input the left pressure value $P_L$, the center pressure value $P_C$, and the right pressure value $P_R$ from each of the plurality of pitot tubes 40. The SSFD block 648 determines the presence of one or more blocked pitot tubes 40 by comparing the left pressure value $P_L$, the center pressure value $P_C$, and the right pressure value $P_R$ to one another. In response to determining one or more of the pressure values $P_L$, $P_C$, $P_R$ differ from the remaining pressure values $P_L$, $P_C$, $P_R$ by a threshold error value, the SSFD block 648 marks the specific pressure value as a miscompare, which is also referred to as a fault. The threshold error value represents the difference between pitot tube readings when a pitot tube 40 is blocked or otherwise non-operational. In the embodiment as shown, three pressure readings (the left pressure value $P_L$, the center pressure value $P_C$, and the right pressure value $P_R$) are shown, however it is to be appreciated that more then or less than three pressure readings may be used as well.

The clamp 650 receives as input the plurality of pressure values (e.g. the left pressure value $P_L$, the center pressure value $P_C$, and the right pressure value $P_R$) from the SSFD block 648, wherein each of the plurality of pressure values correspond to one of the plurality of pitot tubes 40. The clamp 650 also receives as input a fault indicator for each individual pressure value from the SSFD block 648. In other words, the left pressure value $P_L$, the center pressure value $P_C$, and the right pressure value $P_R$ are each associated with an indicator. The indicator is set to TRUE when a fault is detected, otherwise the indicator is set to FALSE. In response to determining there are no fault indicators present, the clamp 650 sends the pressure values to the mid-value selector 652. The mid-value selector 652 then selects one of the pressure values $P_L$, $P_C$, $P_R$. The selected pressure value is set as the total pressure $P_{TOT}$ based on a mid-value selection algorithm.

In response to determining that one or more of the pressure values $P_L$, $P_C$, $P_R$ indicate a fault, then the clamp 650 executes a time delay function that extends a fault during a time interval. In other words, the clamp 650 determines the presence of one or more blocked pitot tubes 40 by comparing the plurality of pressure values to one another, where each blocked pitot tube 40 is a fault condition, and in response to determining a fault condition, the clamp 650 executes the time delay function that extends the fault condition for the time interval. The time interval is set to capture two or more faults that occur in the plurality of pitot tubes 40 during the second (i.e., asynchronous) common mode pneumatic event. In one non-limiting embodiment, the time interval is about two to five seconds. It is to be appreciated that that a fault condition in a particular pitot tube 40 may exist for only a relatively short period of time. In one example, the fault condition may last for only a few tenths of a second. Once a fault condition in one of the plurality of pitot tubes 40 occurs, then a fault condition may occur in a second pitot tube 40 shortly thereafter. However, the fault in the second pitot tube 40 does not occur simultaneously with the other pitot tube fault. In other words, the faults between the plurality of pitot tubes 40 are asynchronous.

The mid-value selector 652 detects an asynchronous common mode pneumatic event because the clamp 650 extends the fault for the time interval. In other words, the mid-value selector 652 is unable to detect a majority of the plurality of pitot tubes 40 (e.g., 2 out of 3 pitot tubes 40) generating an asynchronous fault unless the fault is extended. The clamp 650 is configured to extend the fault that occurs in one of the pitot tube 40 for the time interval. Therefore, when a fault condition occurs in another pitot tube 40, the mid-value selector 652 detects the second common mode pneumatic event. For example, the left pressure $P_L$ reading may indicate a fault condition for only 0.5 seconds (e.g., the fault condition is set to TRUE for 0.5 seconds and then goes back to FALSE). However, the clamp 650 extends the fault for the time interval, which is four seconds in this example. Thus, when the center pressure $P_C$ reading indicates a fault condition about one second after the left pressure $P_L$, the mid-value selector 652 still receives two fault conditions from the clamp 650.

The mid-value selector 652 receives as input two or more pressure values and fault indicators. Each pressure value and fault indicator corresponds to one of the plurality of pitot tubes 40. In response to determining a fault condition, the mid-value selector 652 generates an output signal 660. The output signal 660 indicates the second common mode pneumatic event has occurred. That is, in other words, the output signal 660 detects an asynchronous fault in the plurality of pitot tubes 40. The output signal 660 is sent to the latch 654. In response to receiving the output signal 660 indicating the presence of the second common mode pneumatic event, the latch 654 is set for the time delay. The latch 654 is reset in response to the measured dynamic pressure $Q_{bar(m)}$ is determined to be accurate (i.e., a majority of the plurality of pitot tubes 40 no longer display a fault). More specifically, in response to the error between the measured dynamic pressure $Q_{bar(m)}$ and the estimated dynamic pressure $Q_{bar(e)}$ being below a threshold value, the latch 654 receives a reset signal. However, at the end of the time delay if the error between the measured dynamic pressure $Q_{bar(m)}$ and the estimated dynamic pressure $Q_{bar(e)}$ still exceeds the threshold value, then a persistent common mode pneumatic event is detected. Accordingly, the output signal 656 of the second CMPE detector 602 indicates the presence of the second common mode pneumatic event.

Referring to FIG. 14, when either the output signal 642 of the first CMPE detector 600 indicates the presence of the first common mode pneumatic event or the output signal 656 of the second CMPE detector 602 indicates the presence of the second common mode pneumatic event, the output 96 of the CMPE control module 36 is set to TRUE, otherwise the output 96 is set to FALSE. It is to be appreciated that both the first common mode pneumatic event (determined by the first CMPE detector 600) and the second mode pneumatic event (determined by the second CMPE detector 602) both represent a fast-rate common mode pneumatic event. A fast-rate common mode pneumatic event refers to a majority of the plurality of pitot tubes 40 being blocked by some foreign object (e.g., ice, volcanic ash, etc.), where the pressure of the plurality of pitot tubes 40 drops relatively quickly at a specific rate. For example, in one embodiment, the specific rate is about −100 mBar/second, however it is to be appreciated that the rate may change based on the application. In contrast to the fast-rate common mode pneumatic event, the plurality of pitot tubes 40 may also become blocked based on a slow-rate common mode pneumatic event as well. A slow-rate common mode pneumatic event occurs based on a slower blockage that may occur with the plurality of pitot tubes 40. Instead, a slow-rate common mode pneumatic event may be detected and addressed based on conventional techniques that already exist. It is to be appreciated that a slow-rate common mode pneumatic event is not detected by the first and second CMPE detectors 600, 602.

Referring now to FIGS. 1, 4, 6, and 14, when the CMPE control module 36 determines a common mode pneumatic event, the measured dynamic pressure $Q_{bar(m)}$ is substituted with the estimated dynamic pressure $Q_{bar(e)}$ when calculating the estimated angle of attack $\alpha_{est}$. More specifically, when either the first, synchronous common mode pneumatic event is detected by the first CMPE detector 600 or the second, asynchronous pneumatic event is detected by the second CMPE detector 602, the dynamic pressure $Q_{bar(m)}$ is substituted with the estimated dynamic pressure $Q_{bar(e)}$ and the disclosed flight control system 18 is in the extended normal mode of operation.

Figure 17:
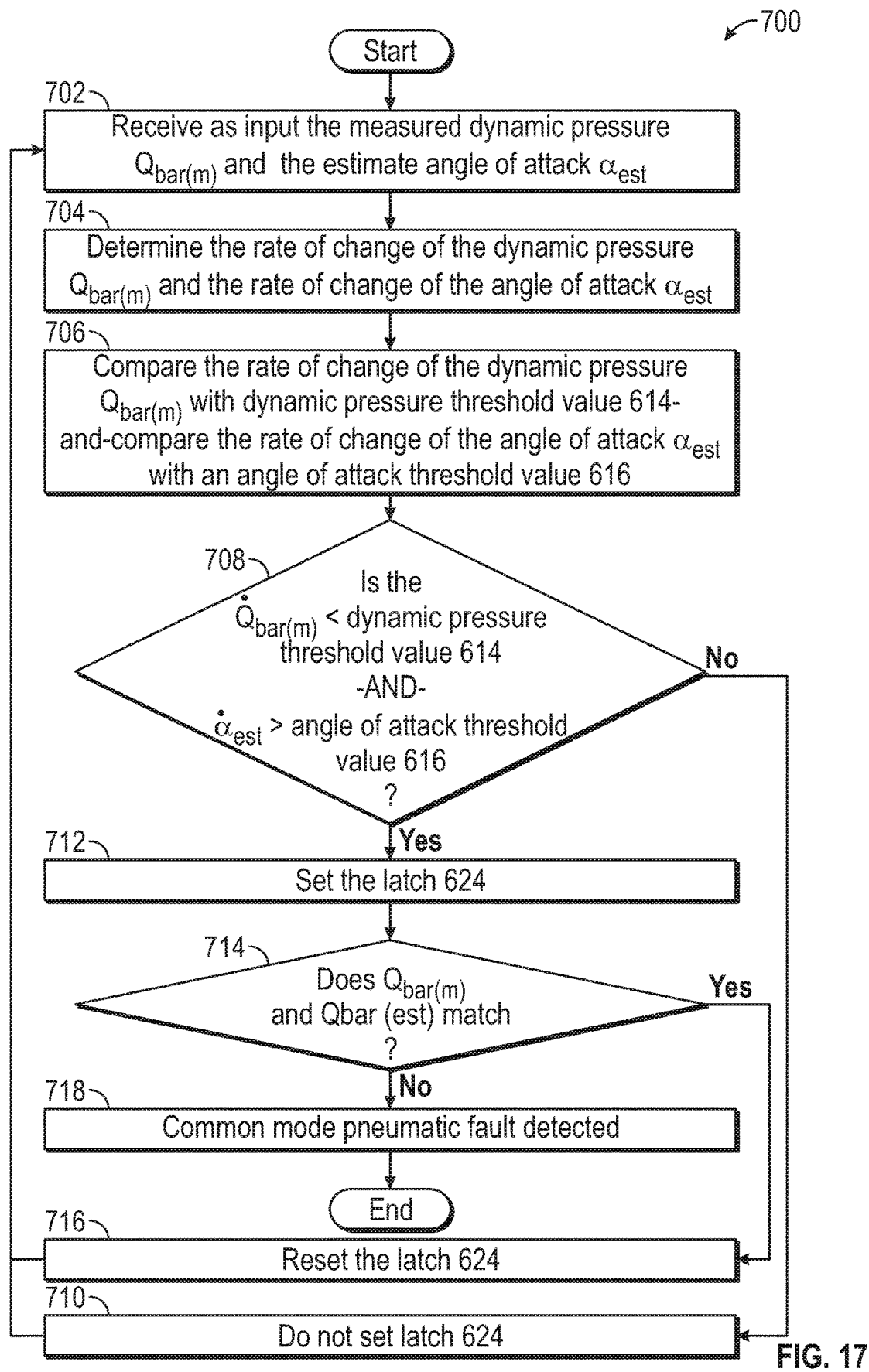
FIG. 17 is a process flow diagram illustrating an exemplary method for determining the synchronous fault based on the system shown in FIG. 15 according to an exemplary embodiment.

FIG. 17 is an exemplary process flow diagram illustrating a method 700 for determining a synchronous fault of the plurality of pitot tubes 40. Referring generally to FIGS. 14 and 17, the method 700 may begin at block 702. In block 702, the CMPE control module 36 receives as input the measured dynamic pressure $Q_{bar(m)}$ and the estimated angle of attack $\alpha_{est}$. The method 700 may then proceed to block 704.

In block 704, the first CMPE detector 600 determines the rate of change of the measured dynamic pressure $\dot{Q}_{bar(m)}$ and the rate of change of the estimated angle of attack $\dot{\alpha}_{est}$. Referring specifically to FIGS. 15 and 17, the measured dynamic pressure washout filter 610 receives as input the measured dynamic pressure $Q_{bar(m)}$ and determines the rate of change of the measured dynamic pressure $\dot{Q}_{bar(m)}$. The estimated angle of attack washout filter 612 receives as input the estimated angle of attack $\alpha_{est}$ the rate of change of the estimated angle of attack $\dot{\alpha}_{est}$. The method 700 may then proceed to block 706.

In block 706, the dynamic pressure comparer 618 receives as input the dynamic pressure threshold value 614 and the rate of change of the measured dynamic pressure $\dot{Q}_{bar(m)}$ and compares the values to one another. Additionally, the estimated angle of attack comparer 620 receives as input the rate of change of the estimated angle of attack $\dot{\alpha}_{est}$ and the estimated angle of attack threshold value 616 and compares the values to one another. The method 700 may then proceed to decision block 708.

In decision block 708, if the dynamic pressure comparer 618 determines that the rate of change of the measured dynamic pressure $\dot{Q}_{bar(m)}$ is not less than the dynamic pressure threshold value 614, and if the estimated angle of attack comparer 620 determines the rate of change of the estimated angle of attack $\dot{\alpha}_{est}$ is not greater than the estimated angle of attack threshold value 616, then the method 700 proceeds to block 710.

In block 710, the latch 624 is not set, and the method 700 returns back to block 702. However, if the dynamic pressure comparer 618 determines that the rate of change of the measured dynamic pressure $\dot{Q}_{bar(m)}$ is less than the dynamic pressure threshold value 614, and if the estimated angle of attack comparer 620 determines the rate of change of the estimated angle of attack $\dot{\alpha}_{est}$ is greater than the estimated angle of attack threshold value 616, then the method 700 proceeds to block 712.

In block 712, the latch 624 is set. The method 700 may proceed to decision block 714.

In decision block 714, if at any point in time during the time delay the measured dynamic pressure $Q_{bar(m)}$ is accurate, then method 700 proceeds to block 716. More specifically, in response to the error between the measured dynamic pressure $Q_{bar(m)}$ and the estimated dynamic pressure $Q_{bar(e)}$ being below a threshold value, the method 700 proceeds to block 716. In block 716, the latch 624 receives a reset signal. The method 700 may then return to block 702. However, if the time delay ends and the error between the measured dynamic pressure $Q_{bar(m)}$ and the estimated dynamic pressure $Q_{bar(e)}$ still exceeds the threshold value, then the method 700 proceeds to block 718. In block 718, the latch 624 and the output signal 642 of the first CMPE detector 600 indicates the presence of the first common mode pneumatic event. The method 700 may then terminate.

Figure 18:
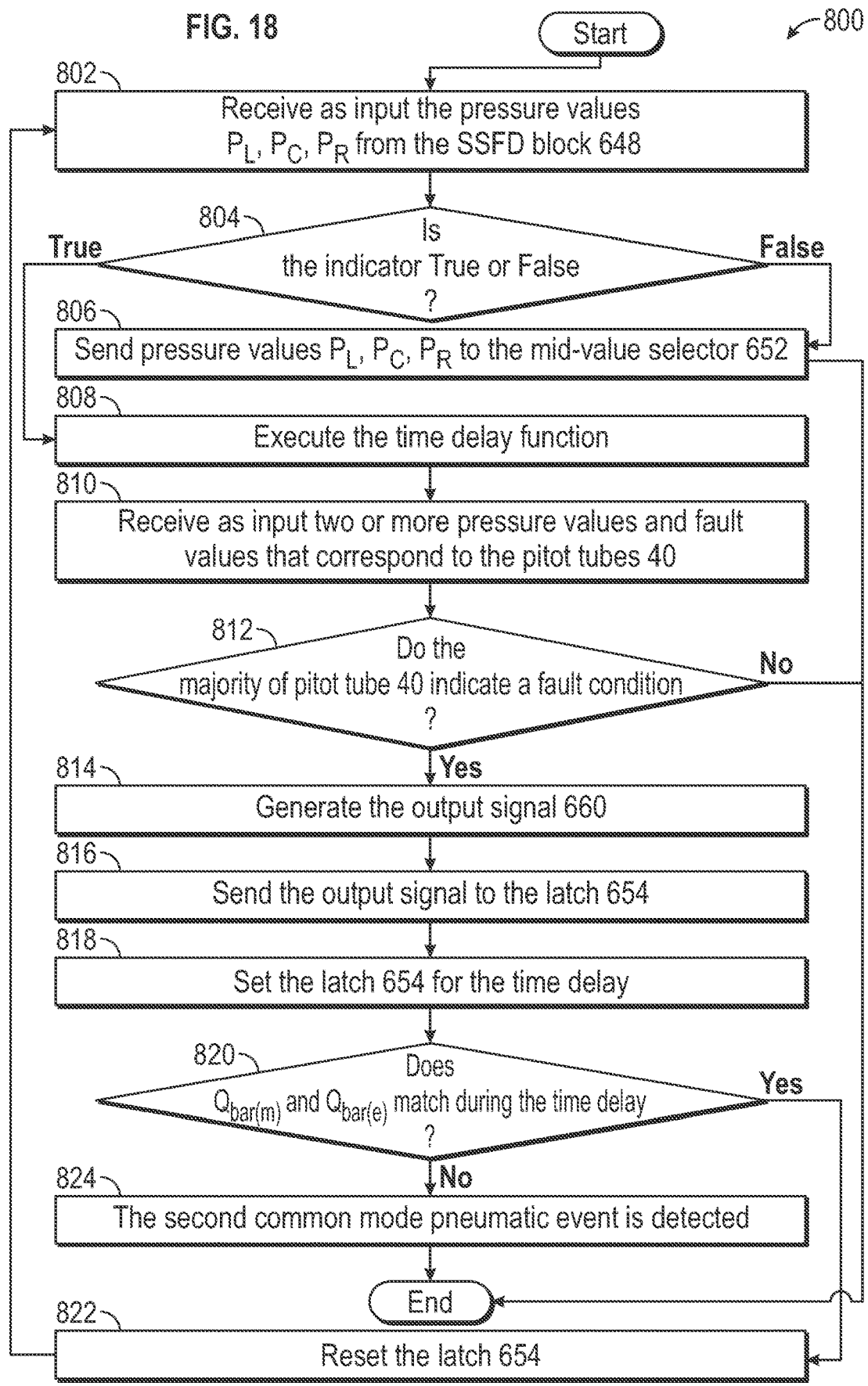
FIG. 18 is a process flow diagram illustrating an exemplary method for determining the asynchronous fault based on the system shown in FIG. 16 according to an exemplary embodiment.

FIG. 18 is an exemplary process flow diagram illustrating a method 800 for determining an asynchronous fault of the plurality of pitot tubes 40. Referring generally to FIGS. 16 and 18, the method 800 may begin at block 802. In block 802, the clamp 650 of the second CMPE detector 602 receives as input the pressure values (e.g. the left pressure value $P_L$, the center pressure value $P_C$, and the right pressure value $P_R$) from the SSFD block 648. The clamp 650 also receives as input a fault indicator for each individual pressure value from the SSFD block 648. The method 800 may then proceed to decision block 804.

In decision block 804, if the indicator is set to FALSE (i.e., no fault is detected), then the method proceeds to block 806. In block 806 the clamp 650 sends the pressure values to the mid-value selector 652. The mid-value selector 652 then selects one of the pressure values. The selected pressure value is set as the total pressure $P_{TOT}$ based on a mid-value selection algorithm. The method 800 may then terminate.

If the indicator is set to TRUE (i.e., a fault is detected), then the method 800 may proceed to block 808. In block 808, the clamp 650 executes the time delay function that extends the fault for the time interval. As mentioned above, the time interval is set to capture two or more faults that occur in the plurality of pitot tubes 40 during the second (i.e., asynchronous) common mode pneumatic event. The method 800 may then proceed to block 810.

In block 810, the mid-value selector 652 receives as input two or more pressure values and fault indicators, where each pressure value and indicator correspond to one of the plurality of pitot tubes 40. The method may then proceed to decision block 812.

In decision block 812, in response to the mid-value selector 652 determining a fault condition is not present, the method 800 may then terminate. In response to the mid-value selector 652 determining a fault condition is present, the method 800 may proceed to block 814. In block 814, the mid-value selector 652 generates the output signal 660. As mentioned above, the output signal 660 indicates the second common mode pneumatic event is detected. The method 800 may then proceed to block 816.

In block 816, the output signal 660 is sent to the latch 654. The method 800 may then proceed to block 818.

In block 818, in response to receiving the output signal 660, the latch 654 is set. The method 800 may proceed to decision block 820.

In decision block 820, if at any point in time during the time delay the measured dynamic pressure $Q_{bar(m)}$ is accurate, then method 800 proceeds to block 822. More specifically, in response to the error between the measured dynamic pressure $Q_{bar(m)}$ and the estimated dynamic pressure $Q_{bar(e)}$ being below a threshold value, the method 800 proceeds to block 822. In block 822, the latch 654 receives a reset signal. The method 800 may then return to block 802. However, if the time delay ends and the error between the measured dynamic pressure $Q_{bar(m)}$ and the estimated dynamic pressure $Q_{bar(e)}$ still exceeds the threshold value, then the method 800 proceeds to block 824. In block 824, the latch 654 and the output signal 656 of the second CMPE detector 602 indicates the presence of the second common mode pneumatic event. The method 800 may then terminate.

Referring generally to FIGS. 14-18, it is to be appreciated that conventional flight control systems presently available may drop out of the normal mode of operation and immediately switch into the secondary mode of operation in response to determining either a faulty dynamic pressure measurement or a faulty estimated angle of attack measurement. In other words, conventional systems do not attempt to isolate the source of error when a fault is detected with either measurement. In contrast, the disclosed system substitutes the measured dynamic pressure with the estimated dynamic pressure in response to detecting a faulty measured dynamic pressure or estimated angle of attack reading. Therefore, the disclosed flight control system does not switch immediately to the second mode of operation like conventional systems, and instead operates in the extended normal mode of operation.

Figure 19:
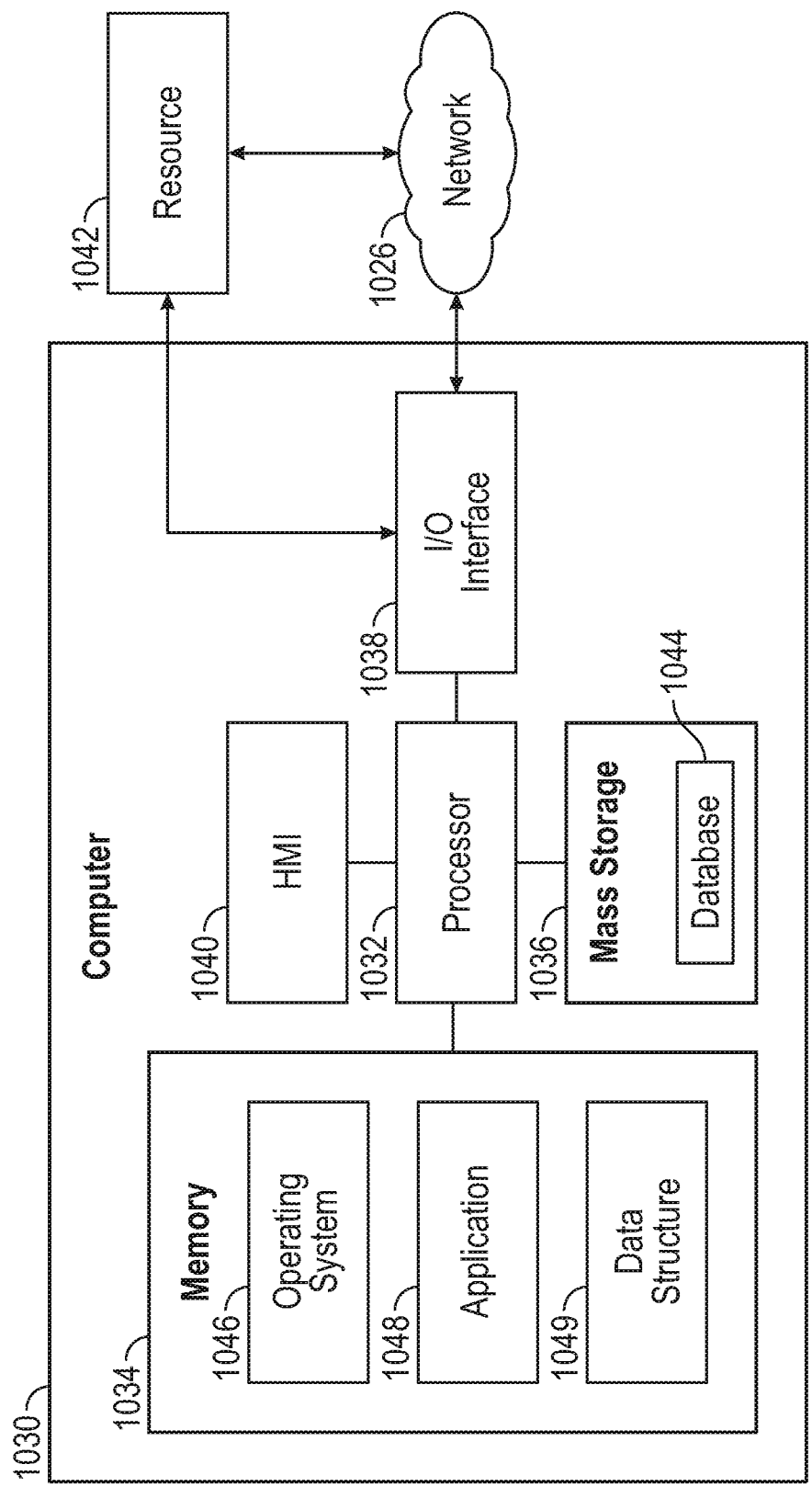
FIG. 19 is an illustration of a computer system used by the flight control system of FIG. 1 according to an exemplary embodiment.

Referring now to FIG. 19, the flight control system 18 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 136 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative embodiment, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising embodiments of the invention. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that embodiments of the invention may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A flight control system for an aircraft including a plurality of displays, the flight control system comprising:
   one or more processors; and
   a memory coupled to the one or more processors, the memory storing data comprising a database and program code that, when executed by the one or more processors, causes the flight control system to:
   receive a signal indicating a total pressure, wherein the total pressure is measured by a plurality of pitot tubes;
   determine a measured angle of attack that is based on a raw angle of attack and a true airspeed of the aircraft;
   receive as input an estimated angle of attack that is based on a total pressure;
   compare the measured angle of attack with the estimated angle of attack to determine an error;
   in response to determining that the error between the measured angle of attack and the estimated angle of attack exceeds a threshold value, determine the presence of a fault with an angle of attack value and provide the estimated angle of attack to the plurality of displays;
   determine a measured dynamic pressure based on the total pressure and a static pressure;
   determine an estimated dynamic pressure based on data collected from a plurality of control surfaces, inertial, and angle of attack sensors;

compare the measured dynamic pressure and the estimated dynamic pressure with one another to determine a difference;

in response to determining the difference between the measured dynamic pressure and the estimated dynamic pressure exceeds another threshold value for a threshold amount of time, determine the presence of a common mode fault of the measured dynamic pressure; and in response to determining the presence of the common mode fault of the measured dynamic pressure, determine the measured angle of attack based on the estimated dynamic pressure.

2. The flight control system of claim 1, further comprising a plurality of angle of attack sensors in communication with the one or more processors, wherein the plurality of angle of attack sensors are configured to measure the raw angle of attack.

3. The flight control system of claim 2, wherein the measured angle of attack is determined based on a moment arm correction term, and an estimated Mach number in addition to the true air speed and the raw angle of attack.

4. The flight control system of claim 2, wherein the plurality of angle of attack sensors each determine an angle of attack value, and wherein the one or more processors execute instructions to:

select one of a plurality of raw angle of attack values based on signal selection and failure detection (SSFD) logic.

5. The flight control system of claim 1, wherein the one or more processors executes instructions to:

receive as input a measured longitudinal acceleration and a measured vertical acceleration;

determine an estimated longitudinal acceleration and an estimated vertical acceleration based on a drag coefficient and a lift coefficient, wherein the drag coefficient and a lift coefficient are based on a first plurality of operating parameters;

determine an acceleration error value for a first difference between the estimated longitudinal acceleration and the estimated vertical acceleration and a second difference between the measured longitudinal acceleration and the measured vertical acceleration; and determine a residual Kalman value by multiplying the acceleration error value for the first difference and the second difference with a Kalman gain value.

6. The flight control system of claim 5, wherein the one or more processors executes instructions to:

determine an estimated rate of change of the angle of attack based on an estimated normal acceleration component of the aircraft;

combine the residual Kalman value with the estimated rate of change of the angle of attack together into a sum; and integrate the sum of the residual Kalman value and the estimated rate of change of the angle of attack to determine the estimated angle of attack.

7. The flight control system of claim 1, wherein the one or more processors executes instructions to:

determine the estimated dynamic pressure based on both a drag coefficient and a lift coefficient, wherein the drag coefficient and the lift coefficient are based on a first plurality of operating parameters of the aircraft.

8. The flight control system of claim 7, wherein the one or more processors executes instructions to:

determine the measured angle of attack based on a moment arm correction term and the raw angle of attack in addition to the estimated dynamic pressure.

9. A flight control system for an aircraft including a plurality of displays, the flight control system comprising:

one or more processors;

a plurality of angle of attack sensors in communication with the one or more processors, wherein the plurality of angle of attack sensors are configured to measure a raw angle of attack; and a plurality of pitot tubes in communication with the one or more processors, wherein the plurality of pitot tubes measure a total pressure;

a memory coupled to the one or more processors, the memory storing data comprising a database and program code that, when executed by the one or more processors, causes the flight control system to:

receive a signal indicating the total pressure;

determine a measured angle of attack that is based on the raw angle of attack and a true airspeed of the aircraft;

receive as input an estimated angle of attack that is based on the total pressure;

compare the measured angle of attack with estimated angle of attack to determine an error;

in response to determining that the error between the measured angle of attack and the estimated angle of attack exceeds a threshold value, determine the presence of a fault with a majority of the plurality of angle of attack sensors and provide the estimated angle of attack to the plurality of displays;

determine a measured dynamic pressure based on the total pressure and a static pressure;

determine an estimated dynamic pressure based on data collected from a plurality of control surfaces, inertial, and angle of attack sensors;

compare the measured dynamic pressure and the estimated dynamic pressure with one another to determine a difference;

in response to determining the difference between the measured dynamic pressure and the estimated dynamic pressure exceeds another threshold value for a threshold amount of time, determine the presence of a common mode fault of the measured dynamic pressure; and in response to determining the presence of the common mode fault of the measured dynamic pressure, determine the measured angle of attack based on the estimated dynamic pressure.

10. The flight control system of claim 9, wherein the measured angle of attack is determined based on a moment arm correction term, and an estimated Mach number in addition to the true air speed and the raw angle of attack.

11. The flight control system of claim 9, wherein the one or more processors executes instructions to:

determine the estimated dynamic pressure based on both a drag coefficient and a lift coefficient, wherein the drag coefficient and the lift coefficient are based on a first plurality of operating parameters.

12. The flight control system of claim 11, wherein the one or more processors executes instructions to:

determine the measured angle of attack based on a moment arm correction term the raw angle of attack in addition to the estimated dynamic pressure.

13. The flight control system of claim 9, wherein the one or more processors executes instructions to:

receive as input a measured longitudinal acceleration and a measured vertical acceleration;

determine an estimated longitudinal acceleration and an estimated vertical acceleration based on a drag coefficient and a lift coefficient;

determine an acceleration error value for a first difference between the estimated longitudinal acceleration and the estimated vertical acceleration and a second difference between the measured longitudinal acceleration and the measured vertical acceleration; and determine a residual Kalman value by multiplying the acceleration error value for the first difference and the second difference with a Kalman gain value.

14. The flight control system of claim 13, wherein the one or more processors executes instructions to:

determine an estimated rate of change of the angle of attack is determined based on an estimated normal acceleration component of the aircraft;

combine the residual Kalman value with the estimated rate of change of the angle of attack together into a sum; and integrate the sum of the residual Kalman value and the estimated rate of change of the angle of attack to determine the estimated angle of attack.

15. A method for determining a fault with an angle of attack value for an aircraft, the method comprising:

receiving a signal indicating a total pressure, wherein the total pressure is measured by a plurality of pitot tubes;

determining, by a computer, a measured angle of attack that is based on a raw angle of attack and a true airspeed of the aircraft;

determining, by the computer, an estimated angle of attack that is determined based on the total pressure;

comparing, by the computer, the measured angle of attack with the estimated angle of attack to determine an error;

in response to determining the error between the measured angle of attack and the estimated angle of attack exceeds a threshold value, determining the presence of the fault with the angle of attack value, wherein the estimated angle of attack is provided to a plurality of displays;

determining a measured dynamic pressure based on the total pressure and a static pressure;

determining an estimated dynamic pressure based on data collected from a plurality of control surfaces, inertial, and angle of attack sensors;

comparing the measured dynamic pressure and the estimated dynamic pressure with one another to determine a difference;

in response to determining the difference between the measured dynamic pressure and the estimated dynamic pressure exceeds another threshold value for a threshold amount of time, determining the presence of a common mode fault of the measured dynamic pressure; and in response to determining the presence of the common mode fault of the measured dynamic pressure, determining the measured angle of attack based on the estimated dynamic pressure.

16. The method of claim 15, further comprising:

determining the measured angle of attack based on a moment arm correction term, and an estimated Mach number in addition to the true airspeed and the raw angle of attack.

17. The method of claim 15, further comprising:

determine an estimated dynamic pressure based on both a drag coefficient and a lift coefficient, wherein the drag coefficient and the lift coefficient are based on a first plurality of operating parameters.

18. The method of claim 17, further comprising:

determine the measured angle of attack based on a moment arm correction term, the raw angle of attack in addition to the estimated dynamic pressure.

19. The method of claim 15, further comprising:

receive as input a measured longitudinal acceleration and a measured vertical acceleration;

determine an estimated longitudinal acceleration and an estimated vertical acceleration based on a drag coefficient and a lift coefficient;

determine an acceleration error value for a first difference between the estimated longitudinal acceleration and the estimated vertical acceleration and a second difference between the measured longitudinal acceleration and the measured vertical acceleration; and determine a residual Kalman value by multiplying the acceleration error value for the first difference and the second difference with a Kalman gain value.

20. The method of claim 19, further comprising:

determine an estimated rate of change of the angle of attack is determined based on an estimated normal acceleration component of the aircraft;

combine the residual Kalman value with the estimated rate of change of the angle of attack together into a sum; and integrate the sum of the residual Kalman value and the estimated rate of change of the angle of attack to determine the estimated angle of attack.

* * * * *